(12) United States Patent
Zewail et al.

(10) Patent No.: US 11,611,980 B2
(45) Date of Patent: Mar. 21, 2023

(54) SIDELINK SHARED CHANNEL DEMODULATION REFERENCE SIGNAL CONFIGURATION SCHEMES

(71) Applicant: QUALCOMM Incorporated, San Diego, CA (US)

(72) Inventors: Ahmed Abdelaziz Ibrahim Abdelaziz Zewail, San Diego, CA (US); Zhifei Fan, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 17/244,680

(22) Filed: Apr. 29, 2021

(65) Prior Publication Data

US 2021/0352698 A1    Nov. 11, 2021

Related U.S. Application Data

(60) Provisional application No. 63/022,335, filed on May 8, 2020.

(51) Int. Cl.
*H04W 72/12* (2023.01)
*H04L 41/0813* (2022.01)
*H04L 5/00* (2006.01)

(52) U.S. Cl.
CPC ....... *H04W 72/1278* (2013.01); *H04L 5/0048* (2013.01); *H04L 41/0813* (2013.01)

(58) Field of Classification Search
CPC ............ H04W 72/1278; H04L 5/0048; H04L 41/0813
See application file for complete search history.

(56) References Cited

U.S. PATENT DOCUMENTS 10,447,447 B2 * 10/2019 Namgoong ........... H04L 5/0051
2017/0367113 A1 * 12/2017 Huang ................. H04L 5/0041
(Continued)

OTHER PUBLICATIONS

International Search Report and Written Opinion—PCT/US2021/030144—ISA/EPO—dated Jul. 27, 2021.
(Continued)

*Primary Examiner* — Duc C Ho
(74) *Attorney, Agent, or Firm* — Holland & Hart LLP

(57) ABSTRACT

Methods, systems, and devices for wireless communications are described. In a first example, the user equipment (UE) may receive sidelink control information scheduling resources for a sidelink data transmission spanning a set of tones and indicating a demodulation reference signal (DMRS) pattern. The UE may identify that each tone of the set of tones is configured to carry a DMRS for a symbol of the DMRS pattern and may receive the sidelink data transmission based on the symbol of the DMRS pattern carrying the DMRS for each tone. In a second example, the UE may receive control signaling indicating a configuration for a non-overlapping relationship between a first resource for receiving a DMRS and a second resource for receiving a phase tracking reference signal. The UE may receive the DMRS over the first resource and the phase tracking reference signal over the second resource based on the non-overlapping relationship.

30 Claims, 19 Drawing Sheets

(56) References Cited

U.S. PATENT DOCUMENTS

| | | | | |
|---|---|---|---|---|
| 2018/0367272 | A1* | 12/2018 | Wang | .................... H04L 5/1469 |
| 2019/0090201 | A1* | 3/2019 | Akkarakaran | ...... H04W 52/346 |
| 2019/0349066 | A1* | 11/2019 | Yang | ....................... H04L 5/005 |
| 2020/0052843 | A1 | 2/2020 | Cheng et al. | |

OTHER PUBLICATIONS

Nokia., et al., "Discussion of Physical Layer Structure for Sidelink", 3GPP TSG RAN WG1 #99, 3GPP Draft; R1-1911952, 3rd Generation Partnership Project (3GPP), Mobile Competence Centre, 650, Route Des Lucioles, F-06921 Sophia-Antipolis Cedex, France, vol. RAN WG1, No. RAN WG1, No. Reno, US; Nov. 18, 2019-Nov. 22, 2019, Nov. 9, 2019 (Nov. 9, 2019), 13 Pages, XP051823133, Retrieved from the Internet: URL: https://www.3gpp.org/ftp/tsg_ran/WG1_RL1/TSGR1_9 9/Docs/R1-1911952.zip, R1-1911952-Nokia-5G_V2X_NRSL—Discussion of Physical Layer Structure for Sidelink v1.docx, [retrieved on Nov. 9, 2019], Sections 1-3; Figures 1-2.

Nokia., et al., "Discussions on DMRS for NR Sidelink", 3GPP Draft, 3GPP TSG RAN WG1 Meeting AH-1901, R1-1902577-Nokia-FS_NR_V2X-Discussions on DMRS for NR Sidelink, 3RD Generation Partnership Project (3GPP), Mobile Competence Centre, 650, Route Des Lucioles, F-06921 Sophia-Antipolis Ced, vol. RAN WG1, No. Athens, Greece, Feb. 25, 2019-20199301, Feb. 16, 2019 (Feb. 16, 2019), XP051600270, 9 Pages, Retrieved from the Internet:URL:http://www.3gpp.org/ftp/tsg%5Fran/WG1%5FRL1/TSGR1%5F96/Docs/R1%2D1902577%2Ezip [retrieved on Feb. 16, 2019] The Whole Document, Sections 1-3; figures 2-3.

* cited by examiner

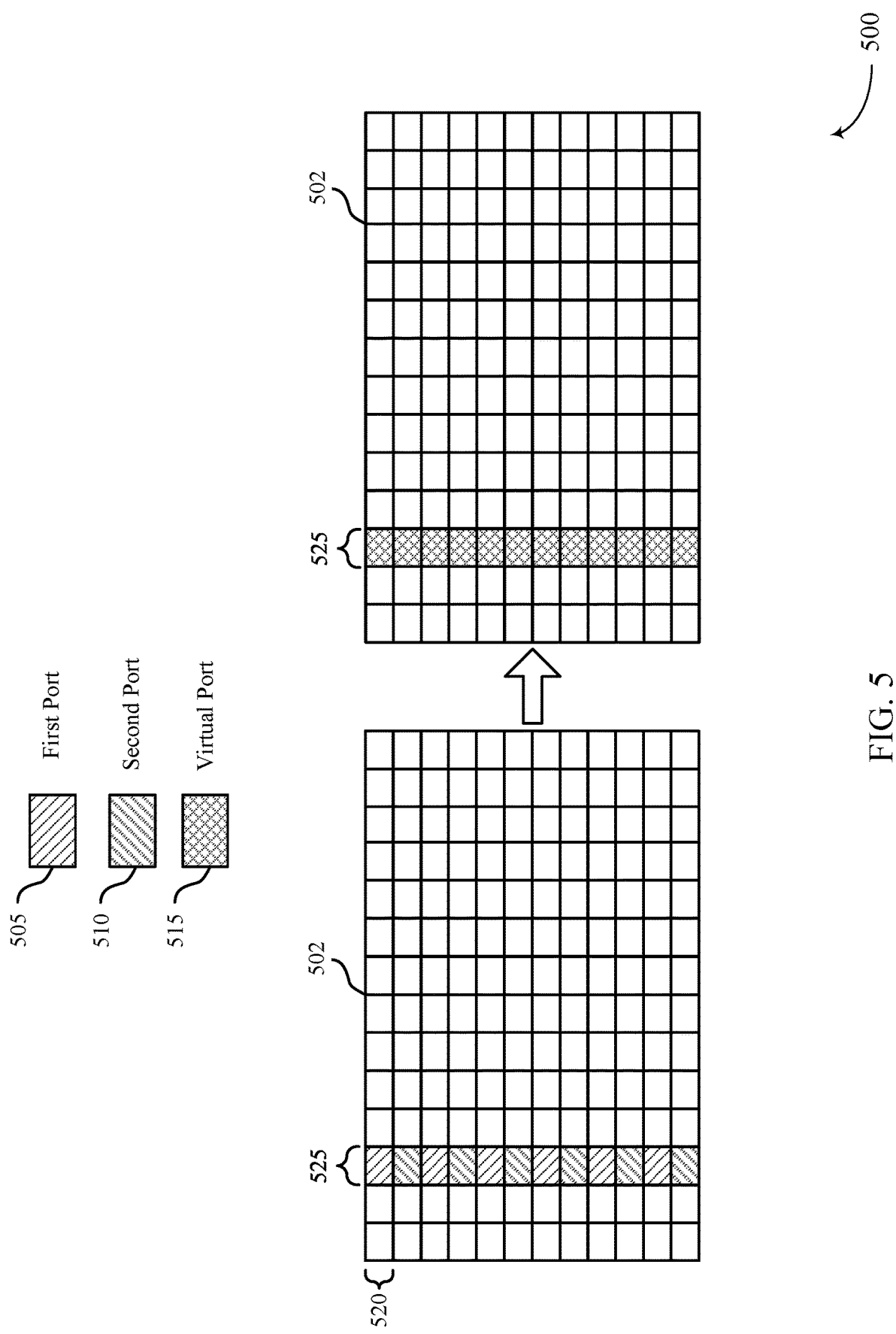

SIDELINK SHARED CHANNEL DEMODULATION REFERENCE SIGNAL CONFIGURATION SCHEMES

CROSS REFERENCE

The present application for patent claims the benefit of U.S. Provisional Patent Application No. 63/022,335 by ZEWAIL et al., entitled "SIDELINK SHARED CHANNEL DEMODULATION REFERENCE SIGNAL CONFIGURATION SCHEMES," filed May 8, 2020, assigned to the assignee hereof, and expressly incorporated by reference herein.

FIELD OF TECHNOLOGY

The following relates generally to wireless communications and more specifically to sidelink shared channel demodulation reference signal configuration schemes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a first user equipment (UE) may perform sidelink communications with a second UE. For instance, the first UE may transmit sidelink control information (SCI) to the second UE that schedules resources for receiving a physical sidelink shared channel (PSSCH) transmission. The first UE may transmit the PSSCH transmission to the second UE over the scheduled resources. In some cases, methods used by the second UE to receive the PSSCH transmission may suffer performance loss as compared to other methods which the second UE may employ.

SUMMARY

The described techniques relate to improved methods, systems, devices, and apparatuses that support sidelink shared channel demodulation reference signal configuration schemes. Generally, the described techniques provide for a user equipment (UE) to receive a sidelink demodulation reference signal (DMRS) over a full-frequency DMRS port. For instance, the UE may receive sidelink control information scheduling resources for a sidelink data transmission spanning a set of tones and indicating a DMRS pattern. The UE may identify that each tone of the set of tones is configured to carry a DMRS for a symbol of the DMRS pattern and may receive the sidelink data transmission based on the symbol of the DMRS pattern carrying the DMRS for each tone.

Additionally, the described techniques may provide for the UE to receive a sidelink DMRS and a sidelink phase tracking reference signal (PTRS) in a manner that limits overhead, where increased overhead may enable a coding loss greater than a performance gain from tracking phase or doppler. For instance, the UE may receive control signaling indicating a configuration for a non-overlapping relationship between a first resource for receiving a DMRS and a second resource for receiving a PTRS. The UE may receive the DMRS over the first resource and a PTRS over the second resource based on the non-overlapping relationship.

A method for wireless communication is described. The method may include receiving sidelink control information scheduling resources for a sidelink data transmission spanning a set of tones and indicating a demodulation reference signal pattern, identifying that each tone of the set of tones is configured to carry a demodulation reference signal for at least one symbol of the demodulation reference signal pattern, and receiving the sidelink data transmission based on the at least one symbol of the demodulation reference signal pattern carrying the demodulation reference signal for each tone.

An apparatus for wireless communication is described. The apparatus may include a processor, memory in electronic communication with the processor, and instructions stored in the memory. The instructions may be executable by the processor to cause the apparatus to receive sidelink control information scheduling resources for a sidelink data transmission spanning a set of tones and indicating a demodulation reference signal pattern, identify that each tone of the set of tones is configured to carry a demodulation reference signal for at least one symbol of the demodulation reference signal pattern, and receive the sidelink data transmission based on the at least one symbol of the demodulation reference signal pattern carrying the demodulation reference signal for each tone.

Another apparatus for wireless communication is described. The apparatus may include means for receiving sidelink control information scheduling resources for a sidelink data transmission spanning a set of tones and indicating a demodulation reference signal pattern, means for identifying that each tone of the set of tones is configured to carry a demodulation reference signal for at least one symbol of the demodulation reference signal pattern, and means for receiving the sidelink data transmission based on the at least one symbol of the demodulation reference signal pattern carrying the demodulation reference signal for each tone.

A non-transitory computer-readable medium storing code for wireless communication is described. The code may include instructions executable by a processor to receive sidelink control information scheduling resources for a sidelink data transmission spanning a set of tones and indicating a demodulation reference signal pattern, identify that each tone of the set of tones is configured to carry a demodulation reference signal for at least one symbol of the demodulation reference signal pattern, and receive the sidelink data transmission based on the at least one symbol of the demodulation reference signal pattern carrying the demodulation reference signal for each tone.

Some examples of the method, apparatuses, and non-transitory computer-readable medium described herein may further include operations, features, means, or instructions for receiving an indication of a port configuration for receiving the demodulation reference signal, updating an aspect of the port configuration, and receiving the demodulation reference signal based on the updated aspect.

In some examples of the method, apparatuses, and non-transitory computer-readable medium described herein, the aspect may be updated based on a subcarrier spacing, a channel delay spread, or both.

Some examples of the method, apparatuses, and non-transitory computer-readable medium described herein may further include operations, features, means, or instructions for receiving an indication of a modulation coding scheme, where the aspect may be updated based on the modulation coding scheme.

In some examples of the method, apparatuses, and non-transitory computer-readable medium described herein, the aspect may be updated based on the modulation coding scheme having a value above a threshold.

In some examples of the method, apparatuses, and non-transitory computer-readable medium described herein, the aspect may be further updated based on a subcarrier spacing, a channel delay spread, or both.

In some examples of the method, apparatuses, and non-transitory computer-readable medium described herein, the sidelink control information includes a parameter indicating the aspect to update.

In some examples of the method, apparatuses, and non-transitory computer-readable medium described herein, the parameter includes an index of a table that corresponds to the updated aspect, where updating the aspect includes selecting the updated aspect from the table according to the index.

In some examples of the method, apparatuses, and non-transitory computer-readable medium described herein, the port configuration includes a first port and a second port configured to receive the demodulation reference signal, and where updating the aspect includes combining the first port and the second port to form a virtual port, and where the demodulation reference signal may be received over the virtual port.

In some examples of the method, apparatuses, and non-transitory computer-readable medium described herein, the port configuration includes a first port and a second port, and where updating the aspect includes determining to refrain from performing code division multiplexing on the first port with the second port when receiving the demodulation reference signal over the first port, and where the demodulation reference signal may be received over the first port.

In some examples of the method, apparatuses, and non-transitory computer-readable medium described herein, the port configuration includes a first port corresponding to a first comb configuration and a second port corresponding to a second comb configuration, where the first port may be configured to use the first comb configuration and the second port may be configured to use the second comb configuration to receive the demodulation reference signal, and where updating the aspect includes determining to use a single one of the first comb configuration or the second comb configuration to receive the demodulation reference signal.

In some examples, the port configuration includes a first port and a second port, where updating the aspect includes one or more of: combining the first port and the second port to form a virtual port, where the demodulation reference signal is received over the virtual port; determining to refrain from performing code division multiplexing on the first port with a third port when receiving the demodulation reference signal over the first port, where the demodulation signal is received over the first port; and determining to use a single one of a first comb configuration corresponding to the first port or a second comb configuration corresponding to the second port to receive the demodulation reference signal.

Some examples of the method, apparatuses, and non-transitory computer-readable medium described herein may further include operations, features, means, or instructions for receiving an indication of a port configured to receive the demodulation reference signal over each tone of the set of tones, where the port may be used to receive the demodulation reference signal.

In some examples of the method, apparatuses, and non-transitory computer-readable medium described herein, the at least one symbol of the demodulation reference signal pattern may include operations, features, means, or instructions for identifying a first port associated with a first comb configuration and a second port associated with a second comb configuration, combining the first port and the second port to form a virtual port associated with the first comb configuration and the second comb configuration, receiving the demodulation reference signal in the first symbol over the virtual port using the first comb configuration, where receiving the demodulation reference signal in the first symbol may include operations, features, means, or instructions for refraining from using the second comb configuration to receive the demodulation reference signal, and receiving the demodulation reference signal in the second symbol over the virtual port using the second comb configuration, where receiving the demodulation reference signal in the second symbol may include operations, features, means, or instructions for refraining from using the second comb configuration to receive the demodulation reference signal.

A method for wireless communications is described. The method may include transmitting, to a UE, sidelink control information scheduling resources for a sidelink data transmission spanning a set of tones and indicating a demodulation reference signal pattern, where each tone of the set of tones is configured to carry a demodulation reference signal for at least one symbol of the demodulation reference signal pattern and transmitting the sidelink data transmission based on the at least one symbol of the demodulation reference signal carrying the demodulation reference signal for each tone.

An apparatus for wireless communications is described. The apparatus may include a processor, memory in electronic communication with the processor, and instructions stored in the memory. The instructions may be executable by the processor to cause the apparatus to transmit, to a UE, sidelink control information scheduling resources for a sidelink data transmission spanning a set of tones and indicating a demodulation reference signal pattern, where each tone of the set of tones is configured to carry a demodulation reference signal for at least one symbol of the demodulation reference signal pattern and transmit the sidelink data transmission based on the at least one symbol of the demodulation reference signal carrying the demodulation reference signal for each tone.

Another apparatus for wireless communications is described. The apparatus may include means for transmitting, to a UE, sidelink control information scheduling resources for a sidelink data transmission spanning a set of tones and indicating a demodulation reference signal pattern, where each tone of the set of tones is configured to carry a demodulation reference signal for at least one symbol of the demodulation reference signal pattern and means for transmitting the sidelink data transmission based on the at least one symbol of the demodulation reference signal carrying the demodulation reference signal for each tone.

A non-transitory computer-readable medium storing code for wireless communications is described. The code may include instructions executable by a processor to transmit, to a UE, sidelink control information scheduling resources for a sidelink data transmission spanning a set of tones and indicating a demodulation reference signal pattern, where each tone of the set of tones is configured to carry a demodulation reference signal for at least one symbol of the demodulation reference signal pattern and transmit the sidelink data transmission based on the at least one symbol of the demodulation reference signal carrying the demodulation reference signal for each tone.

Some examples of the method, apparatuses, and non-transitory computer-readable medium described herein may further include operations, features, means, or instructions for transmitting an indication of a port configuration for receiving the demodulation reference signal, where the sidelink control information includes a parameter indicating an aspect of the port configuration for the UE to update for receiving the demodulation reference signal.

In some examples of the method, apparatuses, and non-transitory computer-readable medium described herein, the parameter indicates to update the aspect by combining a first port and a second port of the port configuration at the UE to form a virtual port.

In some examples of the method, apparatuses, and non-transitory computer-readable medium described herein, the parameter indicates, to the UE, to update the aspect by refraining from performing code division multiplexing on a first port of the port configuration with a second port of the port configuration when receiving the demodulation reference signal over the first port.

In some examples of the method, apparatuses, and non-transitory computer-readable medium described herein, the parameter indicates, to the UE, to update the aspect by using a single one of a first comb configuration associated with a first port of the port configuration or a second comb configuration associated with a second port of the port configuration to receive the demodulation reference signal.

In some examples of the method, apparatuses, and non-transitory computer-readable medium described herein, the parameter includes an index of a table that corresponds to the updated aspect.

Some examples of the method, apparatuses, and non-transitory computer-readable medium described herein may further include operations, features, means, or instructions for transmitting, to the UE, an indication of a port configured to receive the demodulation reference signal over each tone of the set of tones.

A method for wireless communications is described. The method may include receiving control signaling indicating a configuration for a non-overlapping relationship between a first resource for receiving a demodulation reference signal and a second resource for receiving a phase tracking reference signal and receiving the demodulation reference signal over the first resource and the phase tracking reference signal over the second resource based on the non-overlapping relationship.

An apparatus for wireless communications is described. The apparatus may include a processor, memory in electronic communication with the processor, and instructions stored in the memory. The instructions may be executable by the processor to cause the apparatus to receive control signaling indicating a configuration for a non-overlapping relationship between a first resource for receiving a demodulation reference signal and a second resource for receiving a phase tracking reference signal and receive the demodulation reference signal over the first resource and the phase tracking reference signal over the second resource based on the non-overlapping relationship.

Another apparatus for wireless communications is described. The apparatus may include means for receiving control signaling indicating a configuration for a non-overlapping relationship between a first resource for receiving a demodulation reference signal and a second resource for receiving a phase tracking reference signal and means for receiving the demodulation reference signal over the first resource and the phase tracking reference signal over the second resource based on the non-overlapping relationship.

A non-transitory computer-readable medium storing code for wireless communications is described. The code may include instructions executable by a processor to receive control signaling indicating a configuration for a non-overlapping relationship between a first resource for receiving a demodulation reference signal and a second resource for receiving a phase tracking reference signal and receive the demodulation reference signal over the first resource and the phase tracking reference signal over the second resource based on the non-overlapping relationship.

In some examples of the method, apparatuses, and non-transitory computer-readable medium described herein, receiving the control signaling may include operations, features, means, or instructions for receiving first control signaling indicating the first resource and second control signaling indicating the second resource.

In some examples of the method, apparatuses, and non-transitory computer-readable medium described herein, the second control signaling includes sidelink control information signaling indicating the second resource.

In some examples of the method, apparatuses, and non-transitory computer-readable medium described herein, the second control signaling includes medium access control (MAC) control element signaling or radio resource control signaling indicating the second resource.

In some examples of the method, apparatuses, and non-transitory computer-readable medium described herein, receiving the control signaling may include operations, features, means, or instructions for determining a phase tracking reference signal pattern based on the demodulation reference signal pattern, where the phase tracking reference signal pattern indicates the second resource for receiving the phase tracking reference signal.

Some examples of the method, apparatuses, and non-transitory computer-readable medium described herein may further include operations, features, means, or instructions for receiving a configuration of a frequency density for the phase tracking reference signal pattern via radio resource control signaling.

A method for wireless communications is described. The method may include determining a non-overlapping relationship between a first resource for a demodulation reference signal and a second resource for a phase tracking reference signal, transmitting control signaling indicating a configuration for the non-overlapping relationship, and transmitting the demodulation reference signal over the first resource and the phase tracking reference signal over the second resource based on the non-overlapping relationship.

An apparatus for wireless communications is described. The apparatus may include a processor, memory in electronic communication with the processor, and instructions stored in the memory. The instructions may be executable by the processor to cause the apparatus to determine a non-overlapping relationship between a first resource for a demodulation reference signal and a second resource for a phase tracking reference signal, transmit control signaling indicating a configuration for the non-overlapping relationship, and transmit the demodulation reference signal over the first resource and the phase tracking reference signal over the second resource based on the non-overlapping relationship.

Another apparatus for wireless communications is described. The apparatus may include means for determining a non-overlapping relationship between a first resource for a demodulation reference signal and a second resource for a phase tracking reference signal, means for transmitting control signaling indicating a configuration for the non-overlapping relationship, and means for transmitting the demodulation reference signal over the first resource and the phase tracking reference signal over the second resource based on the non-overlapping relationship.

A non-transitory computer-readable medium storing code for wireless communications is described. The code may include instructions executable by a processor to determine a non-overlapping relationship between a first resource for a demodulation reference signal and a second resource for a phase tracking reference signal, transmit control signaling indicating a configuration for the non-overlapping relationship, and transmit the demodulation reference signal over the first resource and the phase tracking reference signal over the second resource based on the non-overlapping relationship.

In some examples of the method, apparatuses, and non-transitory computer-readable medium described herein, transmitting the control signaling may include operations, features, means, or instructions for transmitting first control signaling indicating the first resource and second control signaling indicating the second resource.

In some examples of the method, apparatuses, and non-transitory computer-readable medium described herein, the second control signaling includes sidelink control information signaling indicating the second resource.

In some examples of the method, apparatuses, and non-transitory computer-readable medium described herein, the second control signaling includes medium access control (MAC) control element signaling or radio resource control signaling indicating the second resource.

In some examples of the method, apparatuses, and non-transitory computer-readable medium described herein, determining the non-overlapping relationship may include operations, features, means, or instructions for transmitting control signaling indicating the demodulation reference signal pattern.

Some examples of the method, apparatuses, and non-transitory computer-readable medium described herein may further include operations, features, means, or instructions for transmitting a configuration of a frequency density for the phase tracking reference signal pattern via radio resource control signaling.

BRIEF DESCRIPTION OF THE DRAWINGS

FIGS. 5 through 8 illustrate examples of port configuration update schemes in accordance with aspects of the present disclosure.

DETAILED DESCRIPTION

Figure 1:
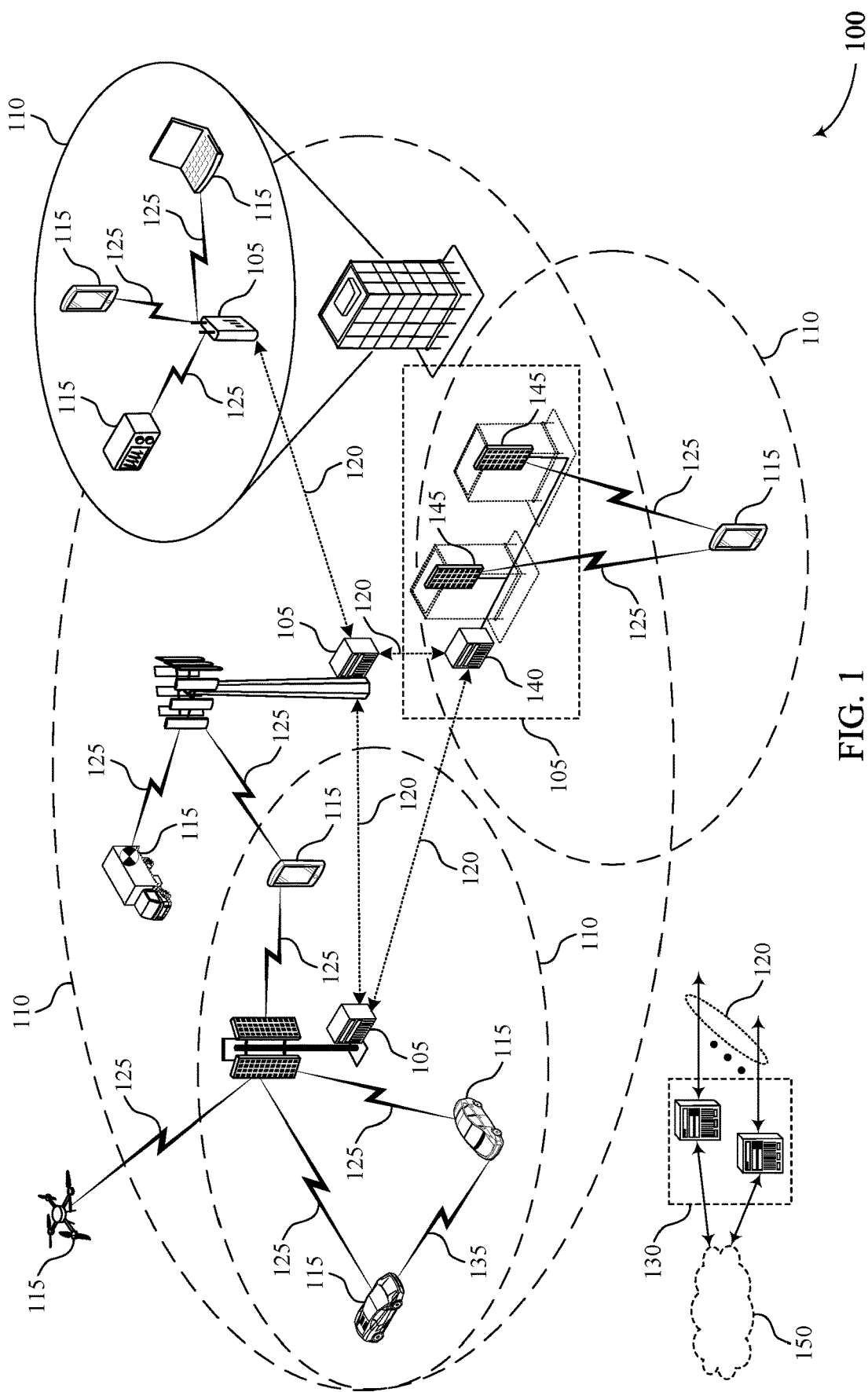
FIG. 1 illustrates an example of a wireless communications system in accordance with aspects of the present disclosure.

A user equipment (UE) may perform sidelink communications, in which the UE communicates with another UE. For instance, a first UE may transmit sidelink control information (SCI) to a second UE that schedules resources for a sidelink data transmission (e.g., a physical sidelink shared channel (PSSCH) transmission). The first UE may modulate the sidelink data transmission and may transmit the sidelink data transmission over the scheduled resources. In some examples, to aid the second UE in demodulating the modulated sidelink data transmission, the first UE may also transmit a demodulation reference signal (DMRS) over one or more resources allocated for the sidelink data transmission. The one or more resources over which the DMRS is transmitted may be referred to as a DMRS pattern.

When the resources scheduling the sidelink data transmission have an associated subcarrier spacing (SCS) below a threshold amount (e.g., at or above 960 kHz), the UE may be capable of interpolating frequency domain channels to receive a sufficient amount of the DMRS for performing demodulation. For example, some frequency tones of a DMRS symbol may not be configured to carry a DMRS signal, and the UE may interpolate a DMRS signal across those frequency tones. However, as bandwidth increases, subcarrier spacing (SCS) may increase above the threshold amount in order to support the enlarged bandwidth. Additionally or alternatively, SCS may increase above the threshold amount as a measure to mitigate phase noise. In either case, when the SCS increases above a threshold amount, the second UE may be incapable of performing the interpolation with sufficient accuracy to demodulate the sidelink transmission or may experience decreased performance in demodulating the sidelink data transmission.

To enable the second UE to use increased SCS while mitigating performance loss, the second UE may identify that, for at least one symbol of the DMRS pattern, the second UE is to receive the DMRS over each tone (e.g., subcarrier) of a set of tones which the sidelink data transmission spans. Such a configuration may be referred to as a full-density or full-frequency DMRS configuration. Additionally or alternatively, the second UE may update an aspect of a port configuration to form a full-density DMRS configuration and may receive the DMRS according to the updated port configuration. For instance, the second UE may combine ports to form a virtual port referred to as a full-frequency DMRS port; may determine that two ports are not to undergo code division multiplexing (CDM) and may receive the DMRS over one of the ports; may determine to use one comb configuration of a set of comb configurations to receive the DMRS; or any combination of these portion configuration update techniques. Such techniques, the methods for determining when to use them, and the associated control signaling, may be described in accordance with aspects of the present disclosure.

In some examples, the first UE may transmit a phase tracking reference signal (PTRS) to the second UE to aid the second UE in compensating phase noise, doppler shift, or both. In some examples, PTRS resources may have an associated time density such that a PTRS may be sent after each DMRS symbol. For instance, after a first symbol over which DMRS is transmitted, a PTRS may be transmitted over a following symbol and may be transmitted according to the time density until another DMRS signal over another symbol. When the other DMRS signal is transmitted over the other symbol, the PTRS may be transmitted over the following symbol and may be transmitted according to the time density until yet another DMRS signal is received. Performing such a method may result in an overhead which may cause more coding loss than a performance gain acquired from tracking the phase or the doppler. Accordingly, such UEs may experience performance loss.

To aid in mitigating such performance loss, the first UE may schedule PTRS resources and DMRS resources while compensating for time allocations of each of them. One method by which the first UE may do so is to transmit dynamic control signaling (e.g., SCI) or semi-dynamic control signaling (e.g., medium access control (MAC) control element (MAC-CE), radio resource control (RRC) signaling) indicating the PTRS resources. Alternatively, the first UE may determine a DMRS pattern and may indicate the DMRS pattern to the second UE. The second UE may determine, from the DMRS pattern, a PTRS pattern that indicates one or more resources for receiving a PTRS and that do not overlap with resources of the DMRS pattern.

Aspects of the disclosure are initially described in the context of wireless communications systems. Additional aspects of the disclosure are described in the context of additional wireless communications systems, DMRS patterns, port configurations, port configuration update schemes, and process flows. Aspects of the disclosure are further illustrated by and described with reference to apparatus diagrams, system diagrams, and flowcharts that relate to sidelink shared channel demodulation reference signal configuration schemes.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

Generally, the described techniques provide for a UE 115 to receive a sidelink DMRS over a full-frequency DMRS port. For instance, the UE 115 may receive sidelink control information scheduling resources for a sidelink data transmission spanning a set of tones and indicating a DMRS pattern. The UE 115 may identify that each tone of the set of tones is configured to carry a DMRS for a symbol of the DMRS pattern and may receive the sidelink data transmission based on the symbol of the DMRS pattern carrying the DMRS for each tone.

Additionally, the described techniques may provide for the UE 115 to receive a sidelink DMRS and a sidelink phase tracking reference signal (PTRS) in non-overlapping resources. For instance, the UE 115 may receive control signaling indicating a first resource for receiving a DMRS and a second resource for receiving a PTRS, where the first resource is non-overlapping with the second resource. The UE 115 may receive the DMRS over the first resource and a PTRS over the second resource based on the first resource being non-overlapping in time with the second resource.

Figures 2A, 2B:
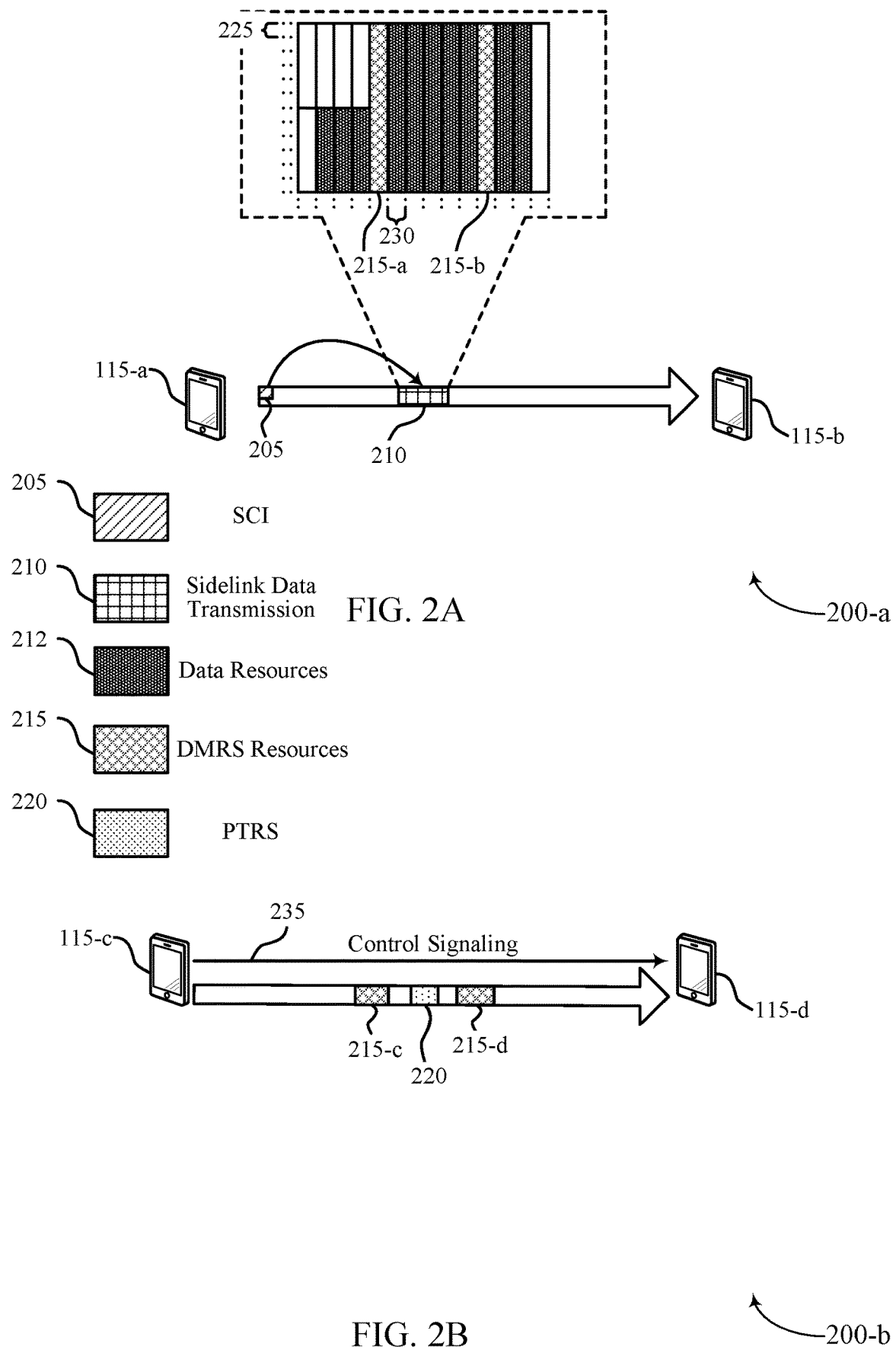
FIGS. 2A and 2B illustrate examples of wireless communications systems in accordance with aspects of the present disclosure.

FIGS. 2A and 2B illustrate examples of wireless communications systems 200-a and 200-b in accordance with aspects of the present disclosure. In some examples, wireless communications systems 200-a and 200-b may implement aspects of wireless communications system 100. For instance, UEs 115-a, 115-b, 115-c, and 115-d may be examples of UEs 115 as described with reference to FIG. 1.

In FIG. 2A, UE 115-a may perform sidelink communications, in which UE 115-a communicates with another UE 115-b. For instance, UE 115-a may transmit SCI 205 to UE 115-b that schedules data resources 212 and one or more resources 215 for a sidelink data transmission 210 (e.g., a PSSCH transmission). UE 115-a may modulate the sidelink data transmission 210 prior to transmission and may transmit the sidelink data transmission 210 over the scheduled data resources 212. In some examples, to aid UE 115-b in demodulating the modulated sidelink data transmission, UE 115-a may also transmit a DMRS over the one or more resources 215 (e.g., DMRS resources 215-a and 215-b) allocated for the sidelink data transmission. The one or more DMRS resources 215 together may be referred to as a DMRS pattern. The SCI 205 may include priority information (e.g., a quality of service (QoS) value), a PSSCH resource assignment (e.g., a frequency or time resource for PSSCH), a resource reservation period (e.g., if enabled), a PSSCH DMRS pattern (e.g., if more than one pattern is configured or preconfigured), a second SCI format (e.g., information on a size of a second SCI), a 2-bit beta offset for second-stage control resource allocation, a number of PSSCH DMRS ports (e.g., 1 or 2), a 5-bit modulation and coding scheme (MCS), and one or more reserved bits.

Each of the data resources 212 and the DMRS resources 215 may span a number of tones 225 and a number of symbols 230. For instance, in the present example, the sidelink data transmission may be allocated 12 tones 225 and 12 symbols 230. The data resources 212 may span 10 of the allocated symbols 230 and may each span multiple tones 225. Likewise, the DMRS resources 215-a and 215-b may each span a single symbol 230 and may span multiple tones 225.

When the DMRS resources 215 have an associated subcarrier spacing (SCS) below a threshold amount (e.g., at or above 960 kHz), some of the tones 225 of each DMRS resource 215 may be used for a first port to receive DMRS and other tones 225 may be used for a second port (e.g., of another UE 115) to receive DMRS. Even though some tones 225 may be used for the first port and other tones 225 may be used for the second port, UE 115-b may be capable of interpolating frequency domain channels such that both ports may independently be used to perform demodulation. However, as bandwidth increases (e.g., to 2 GHz or larger), SCS may increase above the threshold amount in order to support the enlarged bandwidth with a fast Fourier transform (FFT) size below a threshold amount. Additionally or alternatively, SCS may increase above the threshold amount as a measure to mitigate phase noise. In either case, when the SCS increases above a threshold amount, a constraint on coherence bandwidth may increase. Additionally, UE 115-b may be incapable of performing the interpolation with sufficient accuracy to demodulate the sidelink data transmission 210.

To enable UE 115-b to use increased SCS while mitigating performance loss, UE 115-b may update one or more aspects of a port configuration. For instance, UE 115-b may identify that, for at least one symbol of the DMRS pattern, UE 115-b is to receive the DMRS over each tone 225 (e.g., subcarrier) of a set of tones which the sidelink data transmission 210 spans. For instance, UE 115-b may determine that UE 115-b is to receive DMRS over each tone 225 that DMRS resources 215-a or 215-b includes in their span. Such a configuration may be referred to as a full-density or full-frequency DMRS configuration. Additionally or alternatively, if a DMRS is received over two layers, UE 115-b may determine that the ports of each layer are not to be code-division multiplexed together. Instead, one layer may be received on a first comb and a second layer may be received on a second comb. An example of a comb may be described with reference to FIGS. 4A and/or 4B. In some examples, two or more of these aspects may be updated together. For instance, UE 115-a may use a full-density DMRS configuration for one layer and determine that the full-density DMRS configuration of the one layer is not to code-division multiplexed with ports of another layer.

Some examples of updating aspects of the port configuration are described herein. For instance, the disclosure may describe techniques that enable the construction and usage of full-frequency DMRS ports (e.g., for instance, in FIG. 5). The disclosure may describe techniques by which a UE 115 may use the absence of ports in a CDM group to receive DMRS when two layers are used (e.g., for instance, in FIG. 6). The disclosure may describe an indication of whether a comb of a set of combs is available for use or not (e.g., for instance, in FIG. 7). The disclosure may describe techniques by which different DMRS ports may be used over different symbols (e.g., for instance, in FIG. 8).

UE 115-b may employ one or more methods to determine when to update an aspect of the port configuration. For instance, UE 115-b may be preconfigured or configured (e.g., configured via RRC, signaling or activation by SCI, or activation by MAC-CE) to define a full-frequency DMRS port by combining two ports into one port. Additionally or alternatively, UE 115-b may be preconfigured to determine an absence of CDMed ports when configured with rank 2. Additionally or alternatively, UE 115-b may be assigned with a single port associated with a first comb and may not use a second comb, as the second comb may be used by another UE 115 (e.g., for receiving DMRS). For instance, UE 115-b may have a first port and a rank of 1 while another UE 115 may have a full frequency port and a rank of 2.

Additionally or alternatively, UE 115-b may determine to update an aspect of the port configuration based on SCS and a delay spread of the channel (e.g., the channel carrying the sidelink data transmission 210). Additionally or alternatively, UE 115-b may determine to update an aspect of the port configuration (e.g., use a port with higher frequency density, determine two ports are not to be CDMed, or determine to use a single comb configuration) if MCS is above a threshold value. The performance of MCS above the threshold value may be more sensitive to channel estimation errors. As such, UE 115-b may update an aspect of the port configuration when MCS is above the threshold value.

Additionally or alternatively, a table may be defined for PSSCH DMRS parameters to indicate the updated aspect. For instance, the table may indicate which ports may be assigned to UE 115-b and which ones may be absent. Additionally or alternatively, the table may indicate whether multiple ports are to be combined into a virtual port. Such a table may include information concerning time domain allocation of DMRS. The index of the allocation may be conveyed via the SCI 205, by another SCI, or by other control signaling.

Additionally or alternatively, the SCI 205 may include one or more bits indicating to update the aspect. For instance, for rank 1, the SCI 205 may indicate that two ports may be combined into a single port. Additionally or alternatively, when scheduled with a single port, the SCI 205 may include an indication of whether to use the other comb (e.g., a comb associated with a different port) or not. For rank 2, the SCI 205 may indicate an absence of CDMed ports. Additionally or alternatively, a new configuration may be defined that is formed by ports with full-frequency density.

In certain applications (e.g., V2X), more than one DMRS resource 215 (e.g., and thus, more than one DMRS symbol) may be included. As such, different CDM groups may be used in different symbols, which may enable denser coverage in the frequency domain. For instance, for a first configuration type, a first port may be sent on a first DMRS resource 215-a (e.g., a first DMRS symbol) and a second DMRS port may be sent on a second DMRS resource 215-b (e.g., a second DMRS symbol). Thus each resource element (RE) may be covered in the frequency domain by the combination of the two ports. A pre-configured sequence of DMRS patterns or a DMRS table indicating which port is to be sent over each symbol may be used to indicate the change of patterns from one symbol to another.

In FIG. 2B, UE 115-c may transmit (e.g., in a high band) a phase tracking reference signal (PTRS) to UE 115-d to aid UE 115-d in compensating phase noise, doppler shift, or both. Likewise, in certain scenarios (e.g., V2X communications), multiple DMRS resources may be used to compensate for the doppler shift and/or for tracking phase noise. Generally, PTRS signals may be less dense in the frequency domain (e.g., there may be one signal every 1, 2, or 4 resource blocks (RB)), which may result in less overhead than DMRS signals. Accordingly, no dynamic indication may occur for PTRS, whereas the DMRS pattern may change from slot to slot (e.g., according to SCI). In some such examples, a level of overhead may occur between the DMRS and PTRS such that performance degradation may occur.

To aid in mitigating such performance loss, UE 115-c may change the PTRS resources dynamically (e.g., via SCI) or semi-dynamically (e.g., via MAC-CE or RRC) based on the DMRS resources 215 (e.g., DMRS resources 215-c and 215-d) such that the PTRS resources 220 do not overlap with the DMRS resources (e.g., in time, frequency, or both). One method by which the UE 115-c may do so is to provide a dynamic indication of PTRS in SCI. In such cases, UE 115-c may define an allocation table and may convey the index of the row via SCI. The frequency density for the PTRS may be the same as that configured previously (e.g., configured in a previous RRC configuration), but the time allocation may change dynamically. Another method by which UE 115-c may indicate DMRS-PTRS resources that are non-overlapping may be for UE 115-c to perform semi-dynamic changes by indicating the PTRS pattern in RRC or MAC-CE signaling.

Yet another method may involve UE 115-c dynamically tying DMRS and PTRS configurations. For instance, UE 115-c may determine a DMRS pattern (e.g., including DMRS resources 215-c and 215-d) and may indicate the DMRS pattern to UE 115-d. UE 115-d may determine, from the DMRS pattern, an associated PTRS pattern that indicates one or more resources 220 for receiving a PTRS and that do not overlap with resources of the DMRS pattern. In some cases, UE 115-c may transmit RRC signaling (e.g., provide an RRC configuration) indicating PTRS frequency density.

The techniques described herein may have one or more advantages. By using full-frequency DMRS ports, UE 115-b may use increased SCS while mitigating performance loss associated with performing interpolation. Additionally or alternatively, by receiving dynamic or semi-dynamic indications of PTRS, UE 115-d may experience less overhead when determining PTRS resources over which to receive PTRS.

Figure 3:
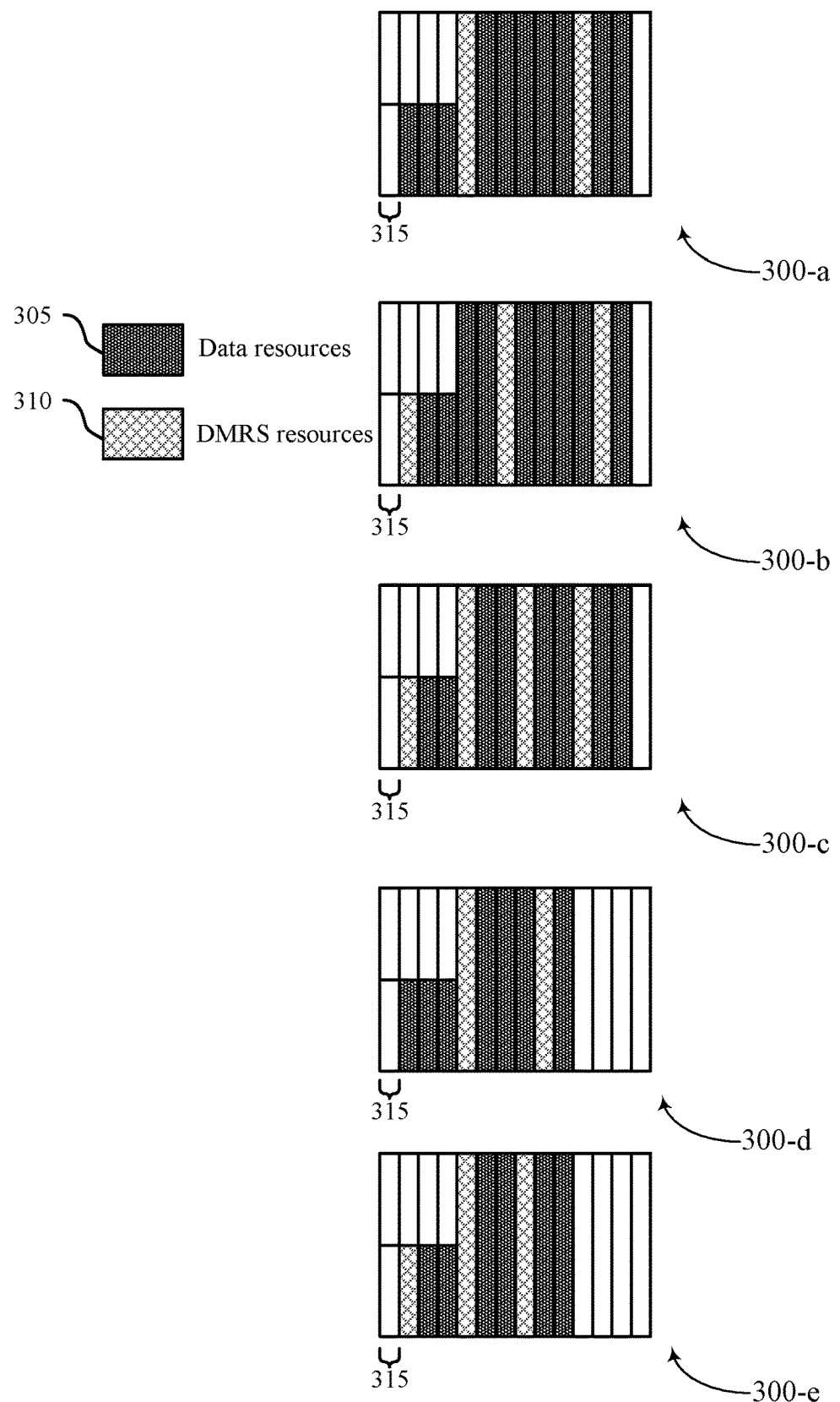
FIG. 3 illustrates examples of demodulation reference signal patterns in accordance with aspects of the present disclosure.

FIG. 3 illustrates examples of DMRS patterns 300-a, 300-b, 300-c, 300-d, and 300-e in accordance with aspects of the present disclosure. In some examples, DMRS patterns 300-a, 300-b, 300-c, 300-d, and 300-e may be implemented by aspects of wireless communications systems 100 and/or 200. For instance, DMRS patterns 300-a, 300-b, 300-c, 300-d, and 300-e may represent allocations for a received sidelink data transmission 210 as described with reference to FIG. 2.

Each DMRS pattern 300 may include data resources 305 and DMRS resources 310, which may be examples of data resources 212 and DMRS resources 215, respectively, as described with reference to FIG. 2. Two-symbol DMRS patterns (e.g., DMRS patterns 300-a and 300-d), three-symbol DMRS patterns (e.g., DMRS patterns 300-b and 300-e) and four-symbol DMRS patterns (e.g., DMRS pattern 300-c) may be configured for use by a transmitting UE 115. The transmitting UE 115 may select a DMRS time pattern and may signal it to a receiving UE 115 according to channel conditions (e.g., via an SCI). DMRS patterns 300-a, 300-b, and 300-c may represent patterns for 12-symbol PSSCH and the DMRS patterns 300-d and 300-e may represent patterns for 9-symbol PSSCH, although it should be noted that DMRS patterns for other PSSCH lengths may also be defined.

One and two-layer transmissions may be supported with quadrature phase shift keying (QPSK), 16 quadrature amplitude modulation (QAM), 64-QAM, and 256-QAM. For one-layer transmissions, a single port may be used. For two-layer transmissions, two ports on one comb may be used with CDM. The other comb may be used for data transmission. An example of a comb may be described with reference to FIGS. 4A and 4B. In some examples, a UE 115 may be configured to update one or aspects of a port configuration associated with a DMRS pattern 300 to receive DMRS signaling according to a full-density or full-frequency configuration, as described in more detail with respect to FIG. 5.

Figures 4A, 4B:
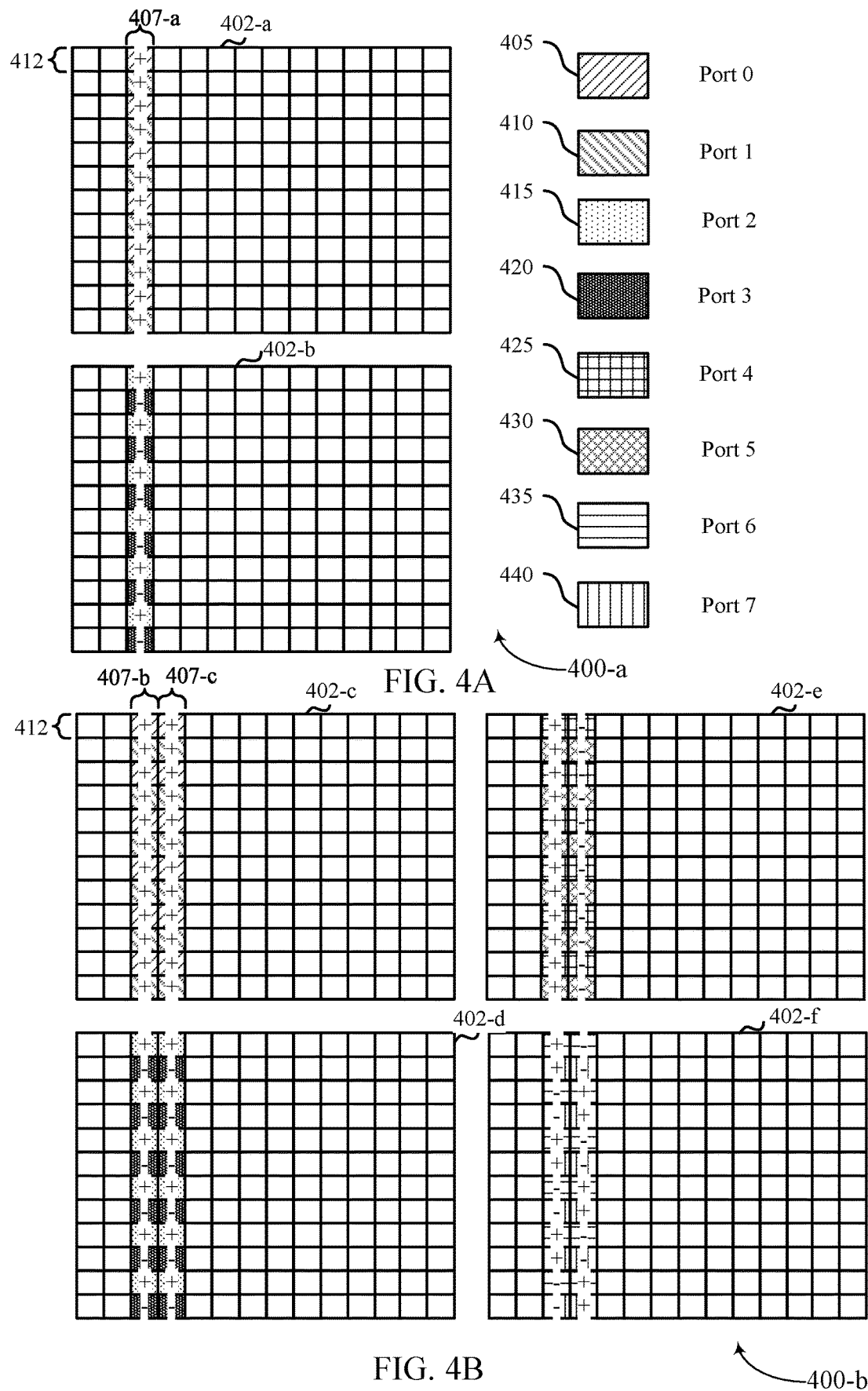
FIGS. 4A and 4B illustrate examples of port configurations in accordance with aspects of the present disclosure.

FIGS. 4A and 4B illustrate examples of port configurations 400-a and 400-b in accordance with aspects of the present disclosure. In some examples, port configurations 400-a and 400-b may implement aspects of wireless communications systems 200 and/or DMRS patterns 300-a, 300-b, 300-c, 300-d, and 300-e. For instance, port configurations 400-a and 400-b may represent a configuration of ports over a DMRS resource 215 as described with reference to FIG. 2 or a DMRS resource 310 as described with reference to FIG. 3.

As demonstrated in FIG. 4A, a UE 115 may receive a DMRS for a sidelink data transmission over a symbol 407-a of at least one of layer grids 402-a and 402-b. Layer grids 402-a and 402-b may represent the time and frequency resources (e.g., defined by symbols 407 and tones 412) for a respective layer and allocated for receiving a sidelink data transmission (e.g., a sidelink data transmission 210 as described with reference to FIG. 2). If the UE 115 receives the DMRS over one of layer grids 402-a or 402-b, the DMRS transmission may be said to be a one-layer DMRS transmission. If the UE 115 receives the DMRS over both layer grids 402-a and 402-b, the DMRS transmission may be said to be a two-layer DMRS transmission.

In layer grid 402-a, the UE 115 may receive the DMRS over a first set of tones 412 for port 405 or a second set of tones 412 for port 410. The first and second sets of tones 412 may be arranged such that each tone 412 of the first set of tones 412 is directly adjacent to a tone 412 of the second set of tones 412. As such, the first set of tones may be said to be in a first comb configuration and the second set of tones may be said to be in a second comb configuration, where the first and second set of comb configurations span the total set of tones in the layer grid 402-a. Similarly, in layer grid 402-b, the UE 115 may receive the DMRS over a third set of tones 412 for port 415 or a fourth set of tones 412 for port 420. The third and fourth sets of tones 412 may be arranged such that each tone of the third set of tones 412 is directly adjacent to a tone 412 of the fourth set of tones 412. As such, the third set of tones may be said to be in a third comb configuration and the fourth set of tones may be said to be in a fourth comb configuration.

Layer grids 402-a and 402-b may span a same set of symbols 407 and tones 412. As such, the first set of tones for port 405 may overlap with the third set of tones 412 for port 415 and the second set of tones for port 410 may overlap with the fourth set of tones 412 for port 420 in time and frequency. Accordingly, ports 405 and 415 may be said to be in a first CDM group and ports 410 and 420 may be said to be in a second CDM group. When the UE 115 receives a two-layer DMRS transmission, the port 405 may be CDMed with port 415 and port 410 may be CDMed with port 420.

As demonstrated in FIG. 4B, a UE 115 may receive a DMRS for a sidelink data transmission over two symbols 407-b and 407-c of at least one of layer grids 402-c, 402-d, 402-e, and 402-f. If the UE 115 receives the DMRS over one of layer grids 402-c, 402-d, 402-e, and 402-f, the DMRS transmission may be said to be a one-layer DMRS transmission. If the UE 115 receives the DMRS over two of the layer grids 402, three of the layer grids 402, or all four of the layer grids 402, the DMRS transmission may be said to be a two-layer DMRS transmission, a three-layer DMRS transmission, or a four-layer DMRS transmission, respectively.

In layer grid 402-c, the UE 115 may receive the DMRS over a first set of tones 412 for port 405 or a second set of tones 412 for port 410. The first and second sets of tones 412 may be arranged such that each tone 412 of the first set of tones 412 is directly adjacent to a tone 412 of the second set of tones 412. As such, the first set of tones may be said to be in a first comb configuration and the second set of tones may be said to be in a second comb configuration, where the first and second set of comb configurations span the total set of tones in the layer grid 402-b. Similarly, in layer grid 402-d, the UE 115 may receive the DMRS over a third set of tones 412 for port 415 or a fourth set of tones 412 for port 420. The third and fourth sets of tones 412 may be arranged such that each tone of the third set of tones 412 is directly adjacent to a tone 412 of the fourth set of tones 412. As such, the third set of tones may be said to be in a third comb configuration and the fourth set of tones may be said to be in a fourth comb configuration.

Similarly, in layer grid 402-e, the UE 115 may receive the DMRS over a fifth set of tones 412 for port 425 or a sixth set of tones 412 for port 430. The fifth and sixth sets of tones 412 may be arranged such that each tone of the fifth set of tones 412 is directly adjacent to a tone 412 of the sixth set of tones 412. As such, the fifth set of tones may be said to be in a fifth comb configuration and the sixth set of tones may be said to be in a sixth comb configuration. Similarly, in layer grid 402-f, the UE 115 may receive the DMRS over a seventh set of tones 412 for port 435 or an eighth set of tones 412 for port 440. The seventh and eighth sets of tones 412 may be arranged such that each tone of the seventh set of tones 412 is directly adjacent to a tone 412 of the eighth set of tones 412. As such, the seventh set of tones 412 may be said to be in a seventh comb configuration and the eighth set of tones 412 may be said to be in an eighth comb configuration.

Layer grids 402-*c*, 402-*d*, 402-*e*, and 402-*f* may span a same set of symbols 407 and tones 412. As such, the first set of tones for port 405 may overlap with the third set of tones 412 for port 415, the fifth set of tones 412 for port 425, and the seventh set of tones 412 for port 435 in time and frequency. Likewise, the second set of tones for port 410, the fourth set of tones for port 420, the sixth set of tones for port 430, and the eighth set of tones for port 440 may overlap together in time and frequency. Accordingly, ports 405, 415, 425, and 435 may be said to be in a first CDM group and ports 410, 420, 430, and 440 may be said to be in a second CDM group. When the UE 115 receives a two-layer DMRS transmission, one port of the first CDM group may be CDMed with another port of the first CDM group and one port of the second CDM group may be CDMed with another port of the second CDM group. For instance, port 405 may be CDMed with port 415 and port 410 may be CDMed with port 420. Generally, the pattern of the port configurations may be orthogonal in 2-by-2 frequency-time resource element (RE) sets. If DMRS ports are scheduled for a UE 115 and co-scheduled UEs 115 are served on a same CDM group, PTRS may not be present for the UE 115 receiving PSSCH. In some examples, a UE 115 may be configured to update one or aspects of a port configuration 400-*a* or 400-*b* to receive DMRS signaling according to a full-density or full-frequency configuration, as described in more detail with respect to FIG. 5.

FIG. 5 illustrates an example of a port configuration update scheme 500 in accordance with aspects of the present disclosure. In some examples, port configuration update scheme 500 may implement aspects of wireless communications systems 100 and/or 200 and/or port configurations 400-*a* and/or 400-*b*. For instance, layer grid 502 may be an example of a layer grid 402 as described with reference to FIGS. 4A and/or 4B.

Initially, UE 115 may be configured with a port configuration in a layer grid 502 that includes a first port 505 associated with a first set of tones 520 in a symbol 525 and a second port 510 associated with a second set of tones 520 in the symbol 525. In some cases, the UE 115 may determine to update the port configuration (e.g., as describe with reference to the examples in FIG. 2). In such cases, the UE 115 may combine the first port 505 and the second port 510 to form a virtual port 515. Virtual port 515 may span each of the tones 520 of the layer grid 502 and may thus be referred to as a full-frequency port. The UE 115 may use the full-frequency port to receive a DMRS transmission.

Figure 6:
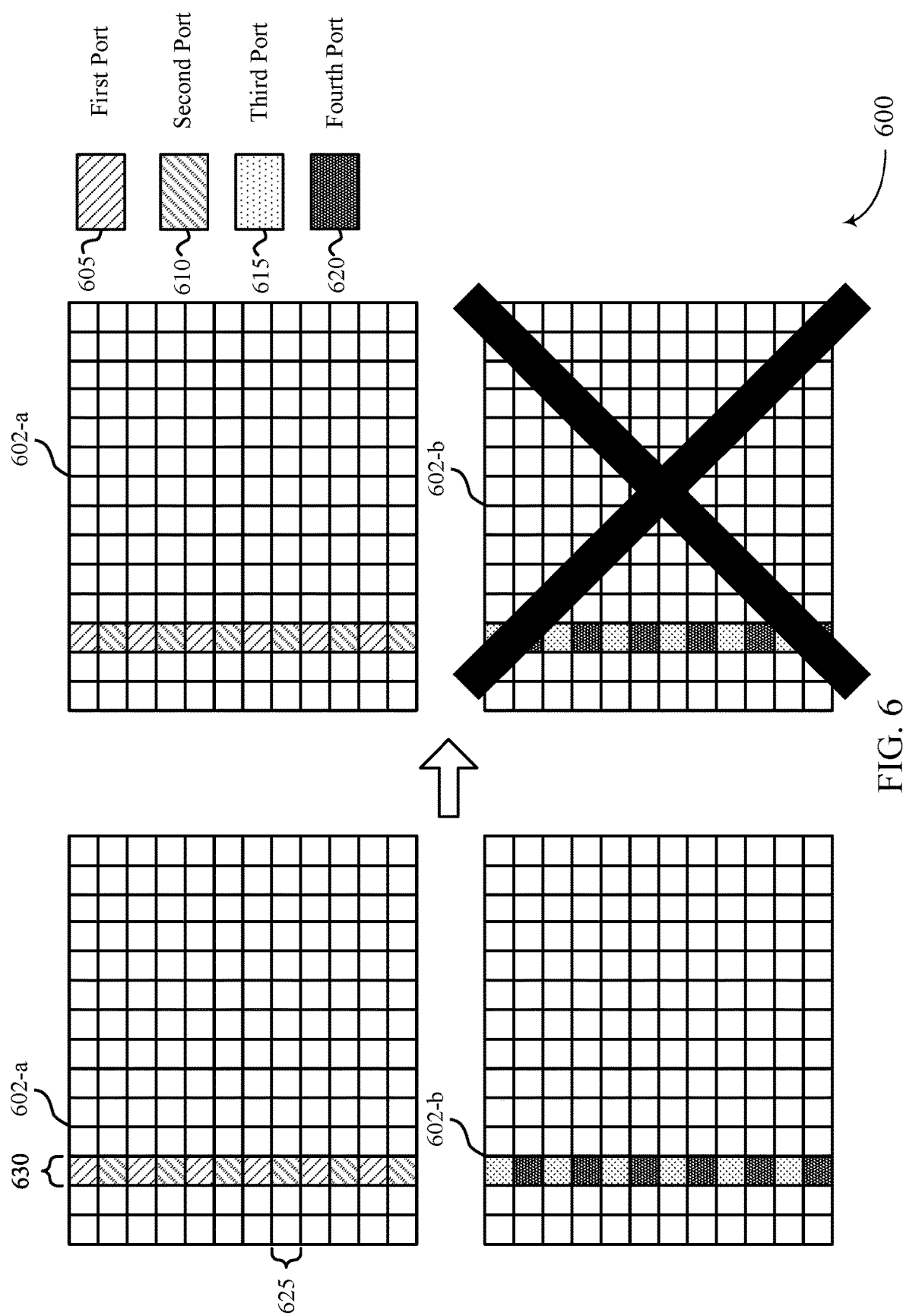

FIG. 6 illustrates an example of a port configuration update scheme 600 in accordance with aspects of the present disclosure. In some examples, port configuration update scheme 600 may implement aspects of wireless communications systems 100 and/or 200 and/or port configurations 400-*a* and/or 400-*b*. For instance, layer grids 602-*a* and 602-*b* may be an example of layer grids 402 overlapping in time and frequency as described with reference to FIGS. 4A and/or 4B.

Initially, a UE 115 may be configured with a port configuration in a layer grid 602-*a* that includes a first port 605 associated with a first set of tones 625 in a symbol 630 and a second port 610 associated with a second set of tones 625 in the symbol 630. Additionally, the UE 115 may be configured with a port configuration in a layer grid 602-*b* that includes a third port 615 associated with a third set of tones 625 in the symbol 630 and a fourth port 620 associated with a fourth set of tones 625 in the symbol 630. The first port 605 and the third port 615 may form a first CDM group and the second port 610 and the fourth port 620 may form a second CDM group.

In some cases, the UE 115 may determine to update the port configuration (e.g., as described with reference to the examples in FIG. 2). In such cases, the UE 115 may determine that the first port 605 is not to be CDMed with the third port 615 and/or that the second port 610 is not to be CDMed with the fourth port 620. Accordingly, the UE 115 may not use the third port 615 and/or fourth port 620 when receiving a DMRS transmission (e.g., the UE 115 may use at least one of first port 605 and second port 610).

Figure 7:
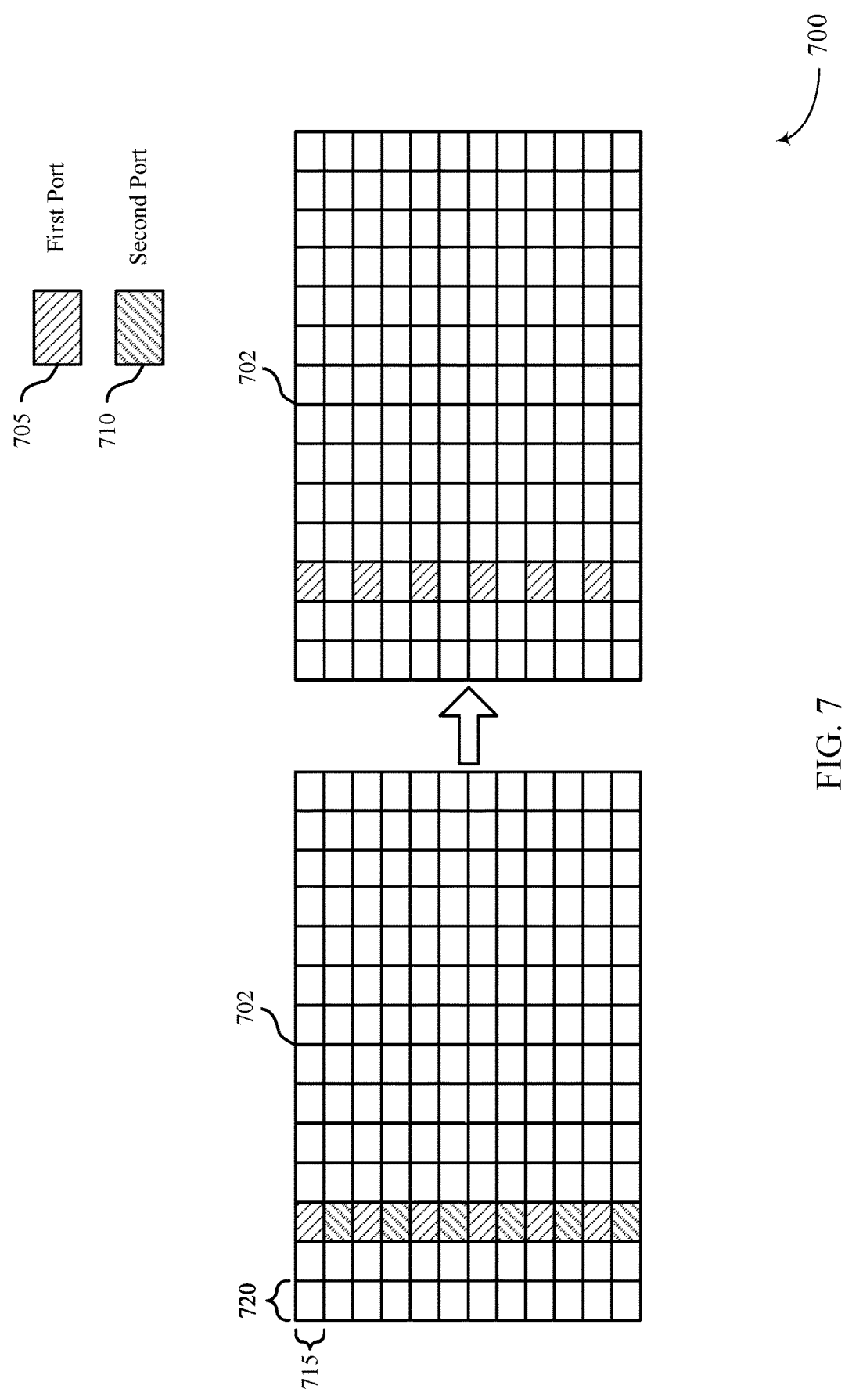

FIG. 7 illustrates an example of a port configuration update scheme 700 in accordance with aspects of the present disclosure. In some examples, port configuration update scheme 700 may implement aspects of wireless communications systems 100 and/or 200 and/or port configurations 400-*a* and/or 400-*b*. For instance, layer grid 702 may be an example of a layer grid 402 as described with reference to FIGS. 4A and/or 4B.

Initially, a UE 115 may be configured with a port configuration in a layer grid 702 that includes a first port 705 associated with a first set of tones 715 in a symbol 720 and a second port 710 associated with a second set of tones 715 in the symbol 720. The first set of tones 715 may be referred to as a first comb configuration and the second set of tones 715 may be referred to as a second comb configuration.

In some cases, the UE 115 may determine to update the port configuration (e.g., as describe with reference to the examples in FIG. 2). In such cases, the UE 115 may select one of the comb configurations (e.g., the first comb configuration) to use for receiving the DMRS. The other comb configuration (e.g., the second comb configuration) may be used by another UE 115 for receiving a DMRS. The UE 115 may use the selected comb configuration to receive a DMRS transmission.

Figure 8:
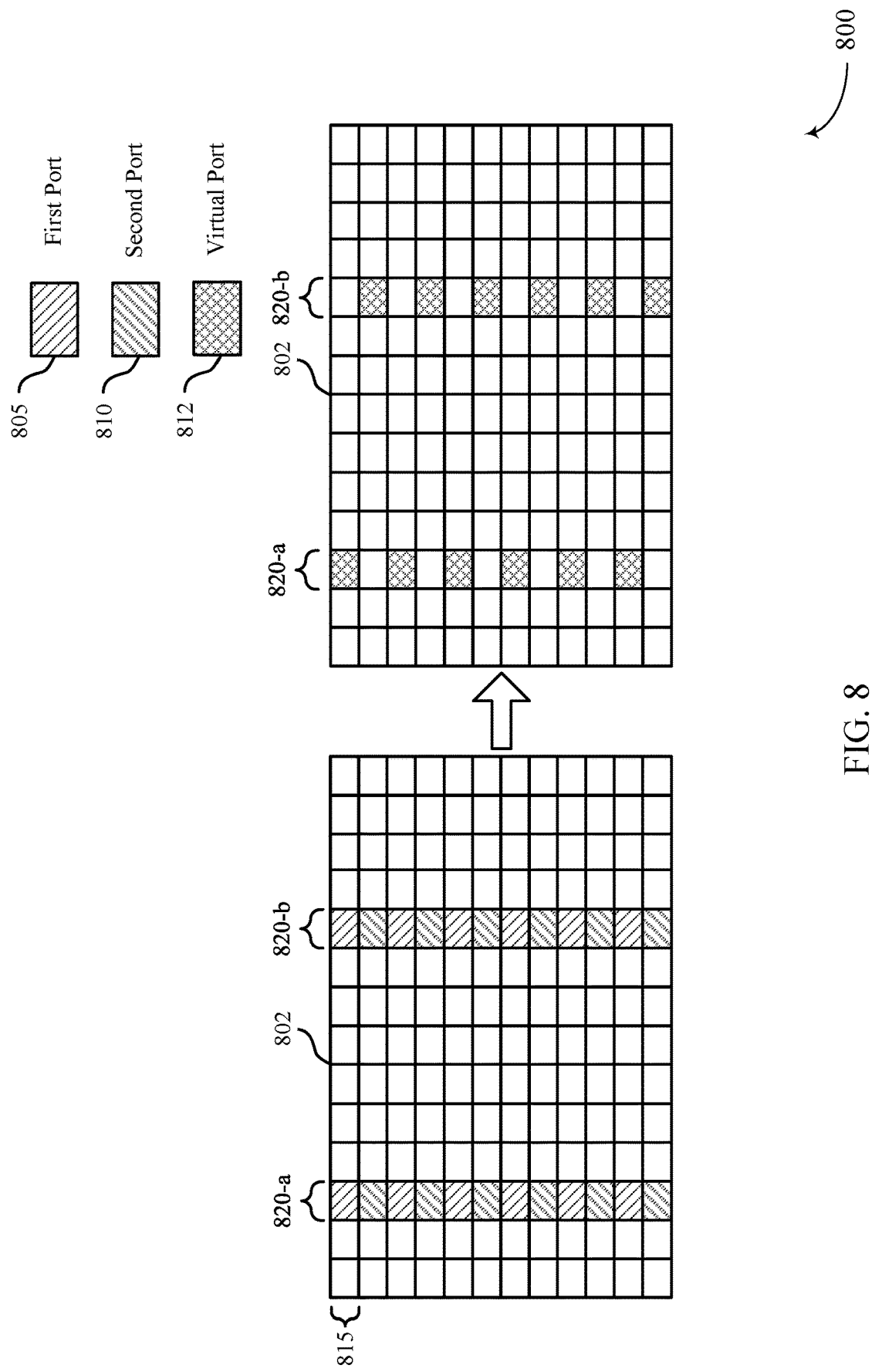

FIG. 8 illustrates an example of a port configuration update scheme 800 in accordance with aspects of the present disclosure. In some examples, port configuration update scheme 800 may implement aspects of wireless communications systems 100 and/or 200 and/or port configurations 400-*a* and/or 400-*b*. For instance, layer grid 802 may be an example of a layer grid 402 as described with reference to FIGS. 4A and/or 4B.

Initially, a UE 115 may be configured with a port configuration in a layer grid 802 that includes a first port 805 associated with a first set of tones 815 in symbols 820-*a* and 820-*b* and a second port 810 associated with a second set of tones 815 in symbols 820-*a* and 820-*b*. The first set of tones 815 may be referred to as a first comb configuration and the second set of tones 815 may be referred to as a second comb configuration.

In some cases, the UE 115 may determine to update the port configuration (e.g., as describe with reference to the examples in FIG. 2). In such cases, the UE 115 may combine the first port 805 and the second port 810 into a virtual port 812. After performing the combining, the UE 115 may select one of the comb configurations (e.g., the first comb configuration) to use for receiving the DMRS over the virtual port 812 in the first symbol 820-*a*. In the first symbol 820-*a*, other comb configuration (e.g., the second comb configuration) may be used for receiving data or may be used by another UE 115 for receiving a DMRS. In the second symbol 820-*b*, the UE 115 may use the other comb configuration (e.g., the second comb configuration) for receiving the DMRS. In the second symbol 820-*b*, the UE 115 may use the comb configuration selected for the first symbol 820-*a* (e.g., the first comb configuration) to receive data. Alternatively, the comb configuration selected for first symbol 820-*a* may be used by another UE 115 for receiving a DMRS. The UE 115 may use the comb configuration selected for first symbol 820-*a* and the other comb configuration selected for second symbol 820-*b* to receive the DMRS. Accordingly the virtual port 812 may act as a full-frequency DMRS port.

Figure 9:
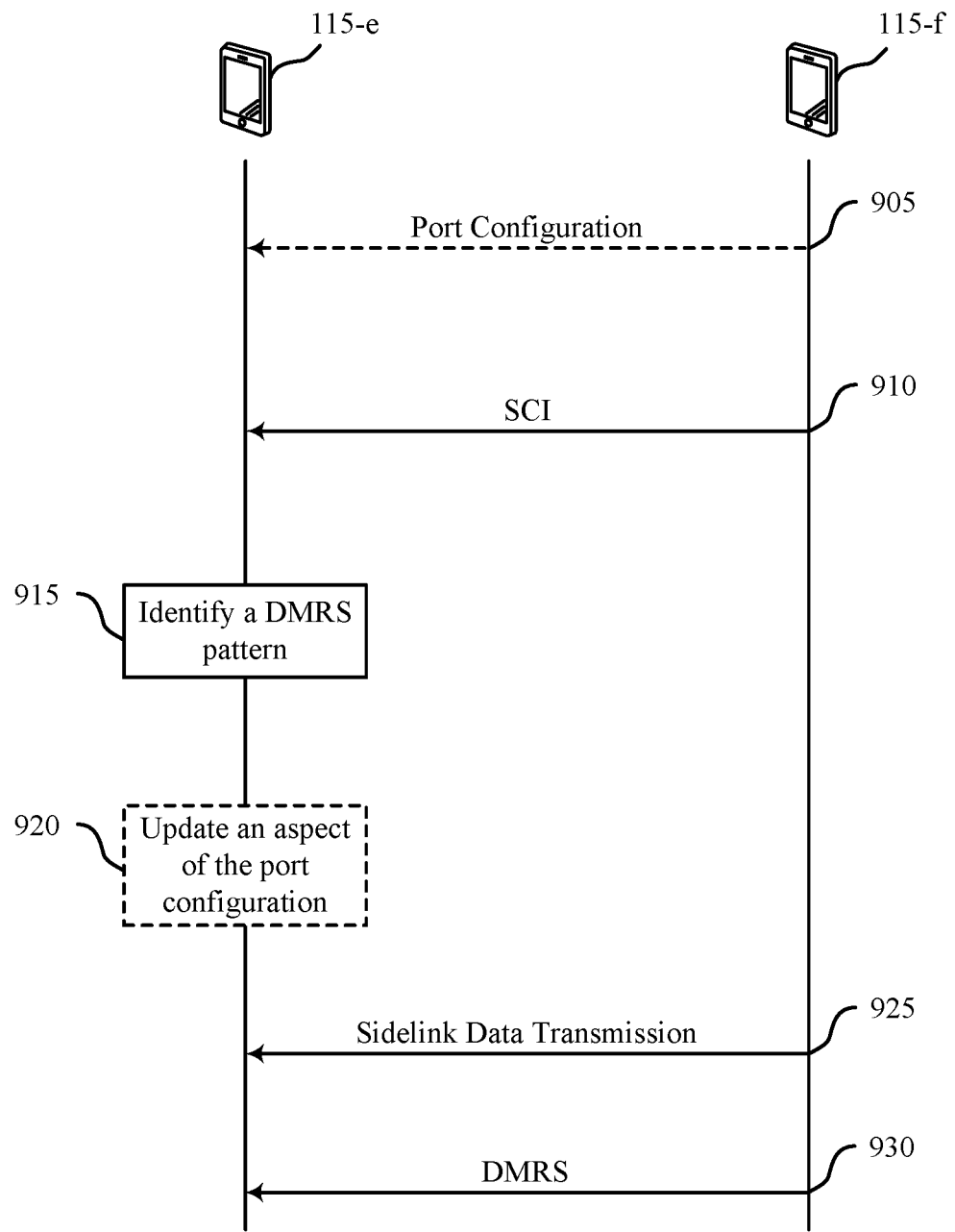
FIGS. 9 and 10 illustrate examples of process flows in accordance with aspects of the present disclosure.

FIG. 9 illustrates an example of a process flow 900 in accordance with aspects of the present disclosure. In some examples, process flow 900 may implement aspects of wireless communications system 100. For instance, UEs 115-*e* and 115-*f* may be examples of UEs 115 as described with reference to FIG. 1.

At 905, UE 115-*f* may transmit an indication of a port configuration for receiving the demodulation reference signal. UE 115-*e* may receive the indication of the port configuration. In some examples, at 905, UE 115-*f* may receive an indication of a port configured to receive the DMRS over each tone of the set of tones (e.g., a full-frequency DMRS port).

At 910, UE 115-*f* may transmit SCI scheduling resources for a sidelink data transmission (e.g., a PSSCH transmission) spanning a set of tones and indicating a DMRS pattern. UE 115-*e* may receive the SCI.

At 915, UE 115-*e* may identify each tone of the set of tones is configured to carry a DMRS for at least one symbol of the DMRS pattern. In some examples, the at least one symbol of the DMRS pattern includes a first symbol and a second symbol.

At 920, UE 115-*e* may update an aspect of the port configuration. In some examples, the port configuration may include a first port and a second port configured to receive the DMRS, and updating the aspect may involve combining the first port and the second port to form a virtual port over which the DMRS is to be received. Additionally or alternatively, the port configuration may include the first port and a third port, where updating the aspect may involve determining that the first port is not to be CDMed with the second port when receiving the DMRS over the first port. Additionally or alternatively, the first port may be associated with a first comb configuration and the second port may be configured with a second comb configuration, where the first port is configured to use the first comb configuration and the second port is configured to use the second comb configuration to receive the DMRS. In such cases, updating the aspect may involve determining to use a single one of the first comb configuration or the second comb configuration to receive the DMRS. Additionally or alternatively, updating the aspect may involve combining the first port and the second port to form a virtual port associated with the first comb configuration and the second comb configuration.

UE 115-*e* may update the aspect based on an SCS, a channel delay spread, or both. Additionally, or alternatively, UE 115-*e* may update the aspect based on an MCS received by UE 115-*e*. For instance, UE 115-*e* may update the aspect if the MCS has a value above a threshold value. In some examples, the SCI (e.g., the SCI transmitted at 910) may include a parameter indicating the aspect to update. The parameter may include an index of a table that corresponds to the updated aspect. In such cases, updating the aspect may involve selecting the updated aspect from the table according to the index.

At 925, UE 115-*f* may transmit the sidelink data transmission based on the at least one symbol of the DMRS pattern carrying the DMRS for each tone.

At 930, UE 115-*f* may transmit the DMRS based on the updated aspect (e.g., the aspect updated at 920). If updating the aspect involves combining the first and second DMRS ports, the DMRS may be received over the virtual port. If updating the aspect involves determining that the first port and a third port are not to be CDMed, the DMRS may be received over the first port. If updating the aspect involves determining to use a single one of the first comb configuration or the second comb configuration, UE 115-*e* may use the single of the one of the first comb configuration or the second to receive the DMRS. In examples where UE 115-*e* receives the indication of the port configured to receive the DMRS over each tone of the set of tones, UE 115-*e* may receive the DMRS using the port.

In cases where UE 115-*e* combines the first and second port associated with the first and second comb configurations, UE 115-*e* may receive the DMRS in the first symbol over the virtual port using the first comb configuration. In such cases, receiving the DMRS in the first symbol may involve refraining from using the second comb configuration to receive the DMRS. Likewise, UE 115-*e* may receive the DMRS in the second symbol over the virtual port using the second comb configuration. In such cases, receiving the DMRS in the second symbol may involve refraining from using the second comb configuration to receive the DMRS.

Figure 10:
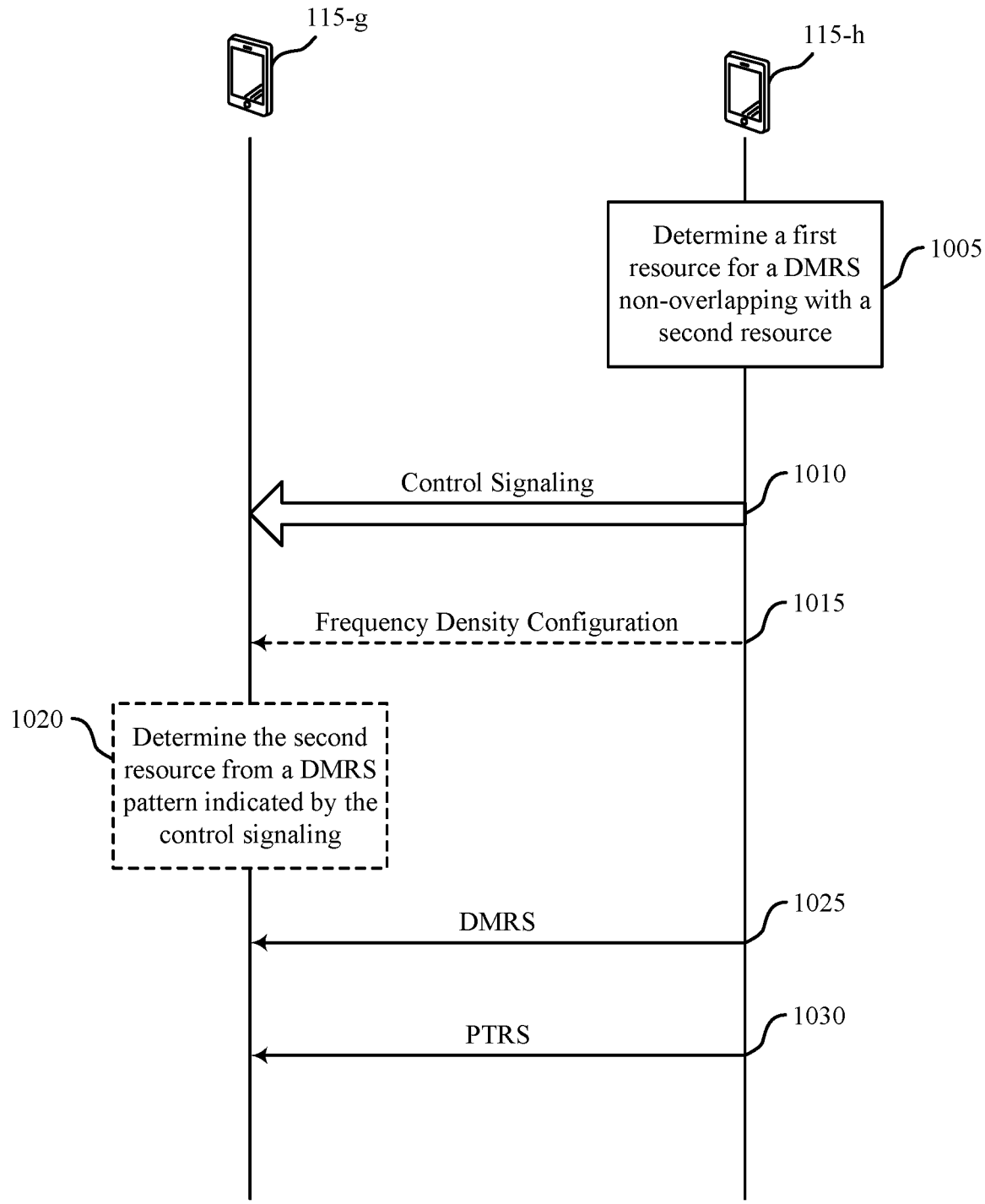

FIG. 10 illustrates an example of a process flow 1000 in accordance with aspects of the present disclosure. In some examples, process flow 1000 may implement aspects of wireless communications system 100. For instance, UEs 115-*g* and 115-*h* may be examples of UEs 115 as described with reference to FIG. 1.

At 1005, UE 115-*h* may determine a non-overlapping relationship between a first resource for a DMRS and a second resource for a PTRS. In some aspects, determining the non-overlapping relationship may involve determining a DMRS pattern of the DMRS associated with a PTRS pattern. The DMRS pattern may indicate the first resource and the PTRS pattern may indicate the second resource.

At 1010, UE 115-*h* may transmit control signaling indicating a configuration for the non-overlapping relationship. In some aspects, the control signaling may include first control signaling indicating the first resource and second control signaling indicating the second resource. The first and second control signaling may indicate the relationship due to UE 115-*h* selecting resources such that the first resource and second resource are non-overlapping. In such cases, the second control signaling may include SCI signaling indicating the second resource. Alternatively, the second control signaling may include MAC-CE signaling or RRC signaling indicating the second resource. UE 115-*g* may receive the control signaling. In cases where UE 115-*h* determines the DMRS pattern, the control signaling may indicate the DMRS pattern.

At 1015, UE 115-*h* may transmit a configuration of a frequency density for the PTRS via RRC signaling. UE 115-*g* may receive the configuration of the frequency density for the PTRS via the RRC signaling.

At 1020, UE 115-*g* may determine the first resource from the DMRS pattern. Additionally, UE 115-*g* may determine a PTRS pattern based on the DMRS pattern, where the PTRS pattern indicates the second resource for receiving the PTRS.

At 1025, UE 115-*h* may transmit the DMRS over the first resource based on the non-overlapping relationship.

At 1030, UE 115-*h* may transmit the PTRS over the second resource based on the non-overlapping relationship.

Figure 11:
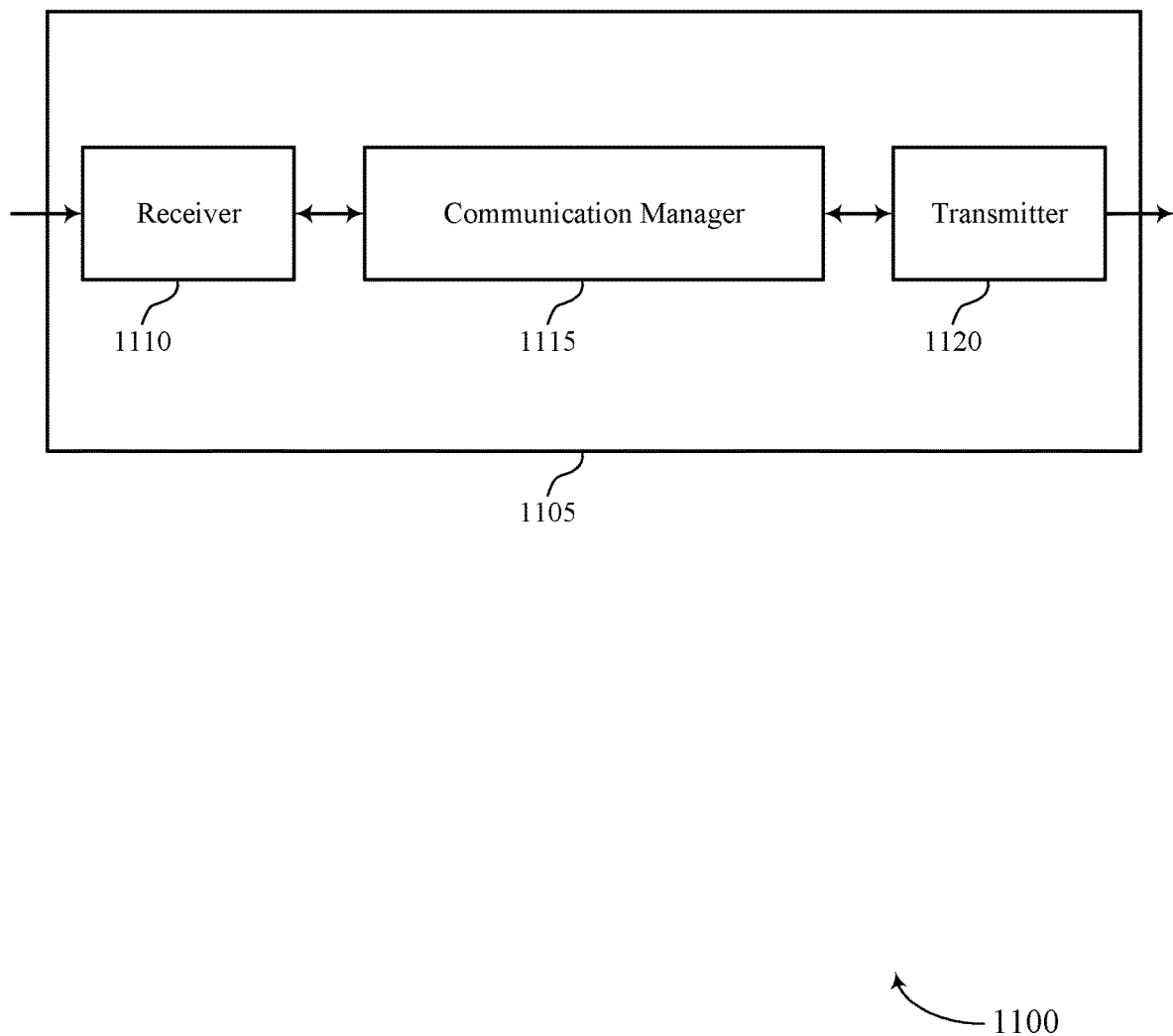
FIGS. 11 and 12 show block diagrams of devices in accordance with aspects of the present disclosure.

FIG. 11 shows a block diagram 1100 of a device 1105 in accordance with aspects of the present disclosure. The device 1105 may be an example of aspects of a UE 115 as described herein. The device 1105 may include a receiver 1110, a communication manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to sidelink shared channel demodulation reference signal configuration schemes, etc.). Information may be passed on to other components of the device 1105. The receiver 1110 may be an example of aspects of the transceiver 1415 described with reference to FIG. 14. The receiver 1110 may utilize a single antenna or a set of antennas.

The communication manager 1115 may receive sidelink control information scheduling resources for a sidelink data transmission spanning a set of tones and indicating a demodulation reference signal pattern; identify that each tone of the set of tones is configured to carry a demodulation reference signal for at least one symbol of the demodulation reference signal pattern; and receive the sidelink data transmission based on the at least one symbol of the demodulation reference signal pattern carrying the demodulation reference signal for each tone. The communication manager 1115 may also transmit, to a UE, sidelink control information scheduling resources for a sidelink data transmission spanning a set of tones and indicating a demodulation reference signal pattern, where each tone of the set of tones is configured to carry a demodulation reference signal for at least one symbol of the demodulation reference signal pattern; and transmit the sidelink data transmission based on the at least one symbol of the demodulation reference signal carrying the demodulation reference signal for each tone. By identifying that each tone of the set of tones is configured to carry a demodulation reference signal for at least one symbol of the demodulation reference signal pattern, the device 1105 may be capable of using increased SCS while mitigating performance loss associated with performing interpolation at the increased SCS.

The communication manager 1115 may also receive control signaling indicating a configuration for a non-overlapping relationship between a first resource for receiving a demodulation reference signal and a second resource for receiving a phase tracking reference signal; and receive the demodulation reference signal over the first resource and the phase tracking reference signal over the second resource based on the non-overlapping relationship. The communication manager 1115 may also determine a non-overlapping relationship between a first resource for a demodulation reference signal and a second resource for a phase tracking reference signal; transmit control signaling indicating a configuration for the non-overlapping relationship; and transmit the demodulation reference signal over the first resource and the phase tracking reference signal over the second resource based on the non-overlapping relationship. By receiving the configuration for the non-overlapping relationship, device 1105 may experience less overhead when determining the second resource. The communication manager 1115 may be an example of aspects of the communication manager 1410 described herein.

By including or configuring the communication manager 1115 in accordance with examples as described herein, the device 1105 (e.g., a processor controlling or otherwise coupled to the receiver 1110, the transmitter 1120, the communication manager 1115, or a combination thereof) may support techniques for the communication manager 1115 to use full-frequency DMRS ports which may enable the device 1105 to use increased SCS while mitigating performance loss associated with performing interpolation. Additionally, the device 1105 may support techniques for the communication manager 1115 to communicate dynamic or semi-dynamic indications of PTRS which may be associated with less overhead than other methods by which the device 1105 may determine PTRS resources over which to communicate PTRS.

The communication manager 1115, or its sub-components, may be implemented in hardware, code (e.g., software or firmware) executed by a processor, or any combination thereof. If implemented in code executed by a processor, the functions of the communication manager 1115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 1115, or its sub-components, may be physically located at various positions, including being distributed such that portions of functions are implemented at different physical locations by one or more physical components. In some examples, the communication manager 1115, or its sub-components, may be a separate and distinct component in accordance with various aspects of the present disclosure. In some examples, the communication manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1415 described with reference to FIG. 14. The transmitter 1120 may utilize a single antenna or a set of antennas.

Figure 12:
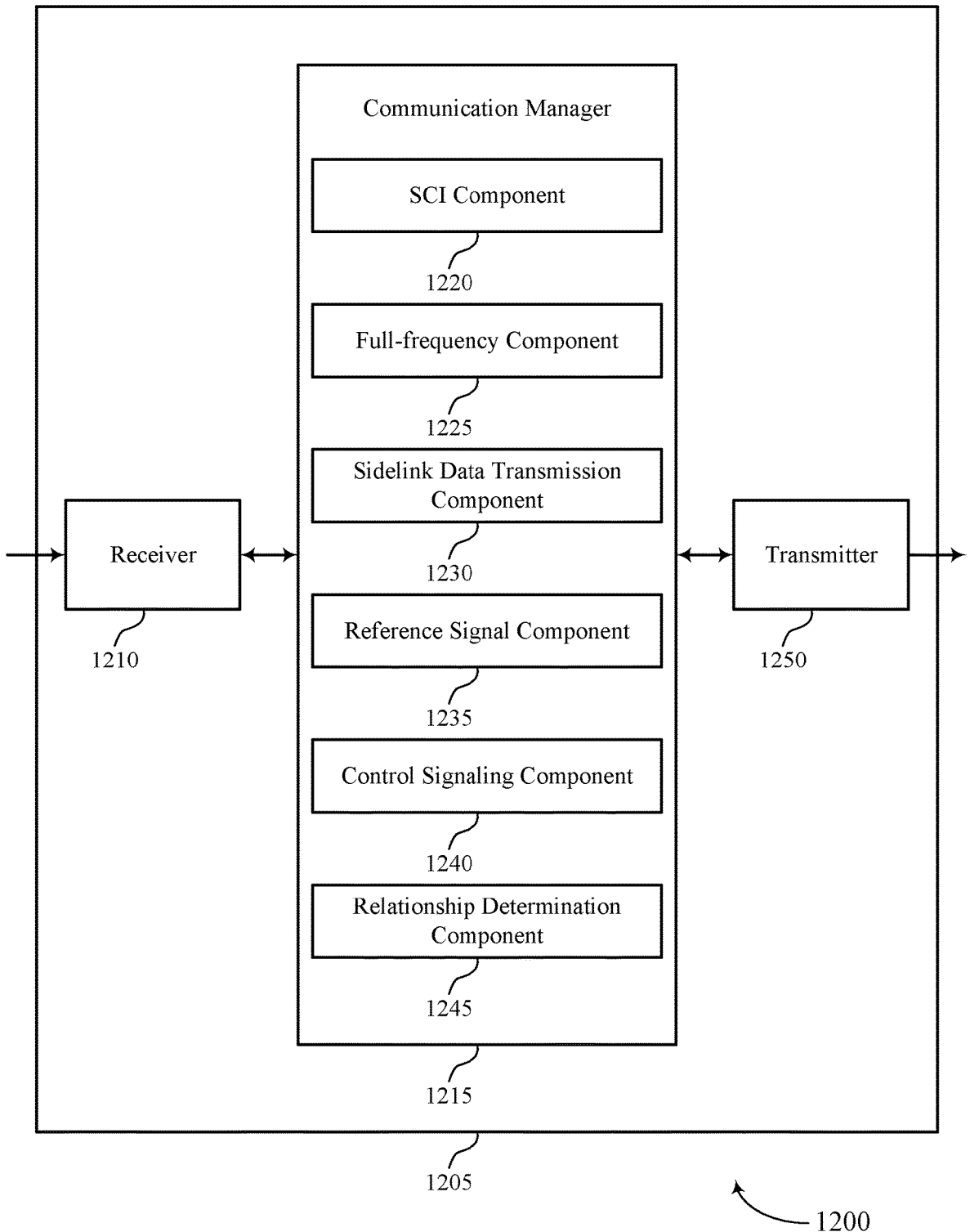

FIG. 12 shows a block diagram 1200 of a device 1205 in accordance with aspects of the present disclosure. The device 1205 may be an example of aspects of a device 1105, or a UE 115 as described herein. The device 1205 may include a receiver 1210, a communication manager 1215, and a transmitter 1250. The device 1205 may also include a processor. Each of these components may be in communication with one another (e.g., via one or more buses).

The receiver 1210 may receive information such as packets, user data, or control information associated with various information channels (e.g., control channels, data channels, and information related to sidelink shared channel demodulation reference signal configuration schemes, etc.). Information may be passed on to other components of the device 1205. The receiver 1210 may be an example of aspects of the transceiver 1415 described with reference to FIG. 14. The receiver 1210 may utilize a single antenna or a set of antennas.

The communication manager 1215 may be an example of aspects of the communication manager 1115 as described herein. The communication manager 1215 may include a SCI component 1220, a full-frequency component 1225, a sidelink data transmission component 1230, a reference signal component 1235, a control signaling component 1240, and a relationship determination component 1245. The communication manager 1215 may be an example of aspects of the communication manager 1410 described herein.

The SCI component 1220 may receive sidelink control information scheduling resources for a sidelink data transmission spanning a set of tones and indicating a demodulation reference signal pattern. The SCI component 1220 may transmit, to a UE, sidelink control information scheduling resources for a sidelink data transmission spanning a set of tones and indicating a demodulation reference signal pattern, where each tone of the set of tones is configured to carry a demodulation reference signal for at least one symbol of the demodulation reference signal pattern.

The full-frequency component 1225 may identify that each tone of the set of tones is configured to carry a demodulation reference signal for at least one symbol of the demodulation reference signal pattern. By identifying that each tone of the set of tones is configured to carry a demodulation reference signal for at least one symbol of the demodulation reference signal pattern, the full-frequency component 1225 may be capable of using increased SCS while mitigating performance loss associated with performing interpolation at increased the SCS.

The sidelink data transmission component 1230 may receive the sidelink data transmission based on the at least one symbol of the demodulation reference signal pattern carrying the demodulation reference signal for each tone. The sidelink data transmission component 1230 may transmit the sidelink data transmission based on the at least one symbol of the demodulation reference signal carrying the demodulation reference signal for each tone.

The reference signal component 1235 may receive a demodulation reference signal over a first resource and a phase tracking reference signal over the second resource based on a non-overlapping relationship between the first resource and the second resource. The reference signal component 1235 may transmit the demodulation reference signal over the first resource and the phase tracking reference signal over the second resource based on a non-overlapping relationship between the first resource and the second resource.

The control signaling component 1240 may receive control signaling indicating a configuration for a non-overlapping relationship between a first resource for receiving a demodulation reference signal and a second resource for receiving a phase tracking reference signal. The control signaling component 1240 may transmit control signaling indicating a configuration for a non-overlapping relationship between a first resource for receiving a demodulation reference signal and a second resource for receiving a phase tracking reference signal. By receiving the configuration for the non-overlapping relationship, control signaling component 1240 may experience less overhead when determining the second resource.

The relationship determination component 1245 may determine a non-overlapping relationship between the first resource for the demodulation reference signal and the second resource for the phase tracking reference signal.

The transmitter 1250 may transmit signals generated by other components of the device 1205. In some examples, the transmitter 1250 may be collocated with a receiver 1210 in a transceiver module. For example, the transmitter 1250 may be an example of aspects of the transceiver 1415 described with reference to FIG. 14. The transmitter 1250 may utilize a single antenna or a set of antennas.

Figure 13:
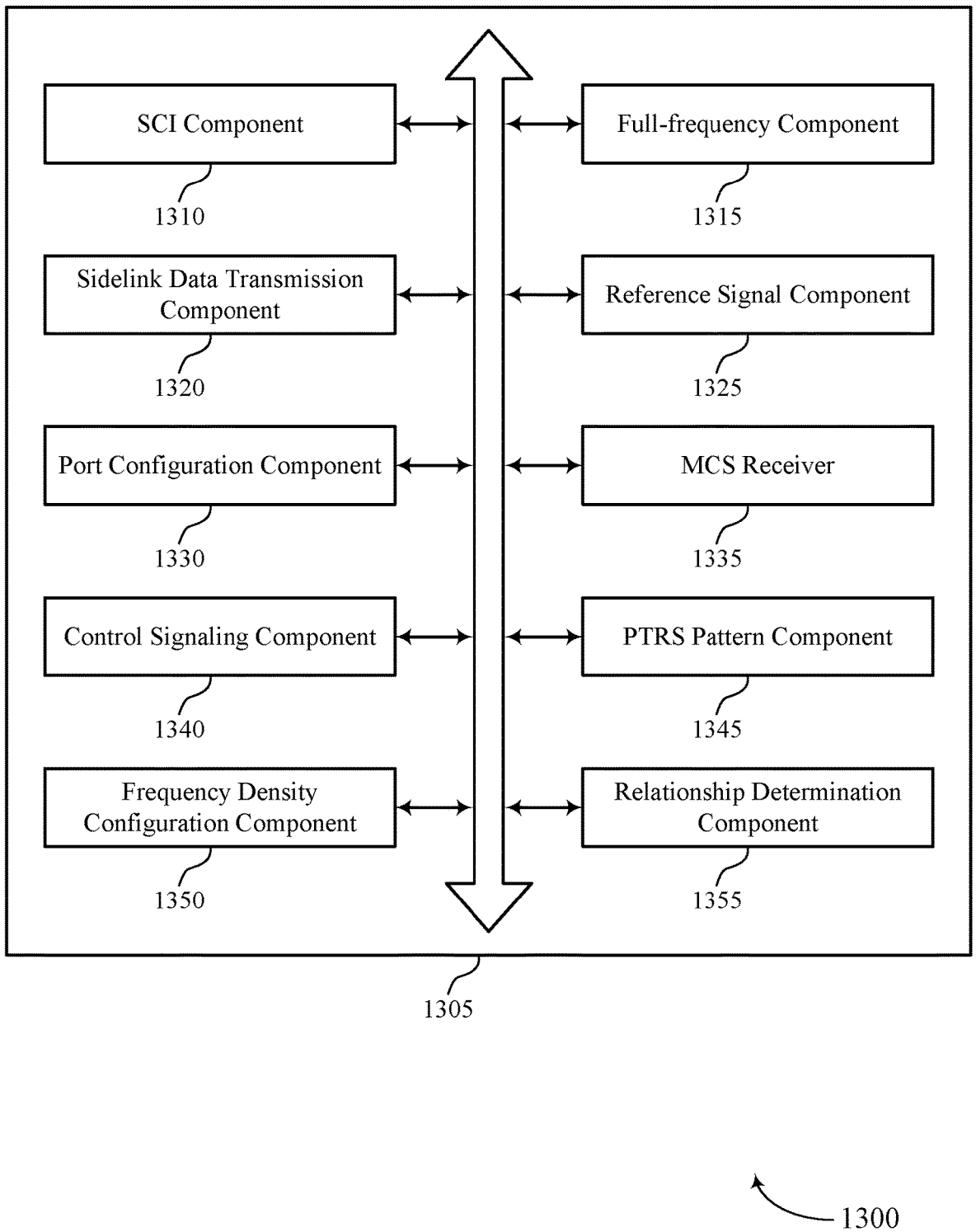
FIG. 13 shows a block diagram of a communication manager in accordance with aspects of the present disclosure.

FIG. 13 shows a block diagram 1300 of a communication manager 1305 in accordance with aspects of the present disclosure. The communication manager 1305 may be an example of aspects of a communication manager 1115, a communication manager 1215, or a communication manager 1410 described herein. The communication manager 1305 may include a SCI component 1310, a full-frequency component 1315, a sidelink data transmission component 1320, a reference signal component 1325, a port configuration component 1330, a MCS receiver 1335, a control signaling component 1340, a PTRS pattern component 1345, a frequency density configuration component 1350, and a relationship determination component 1355. Each of these modules may communicate, directly or indirectly, with one another (e.g., via one or more buses).

The SCI component 1310 may receive sidelink control information scheduling resources for a sidelink data transmission spanning a set of tones and indicating a demodulation reference signal pattern. In some examples, the SCI component 1310 may transmit, to a UE, sidelink control information scheduling resources for a sidelink data transmission spanning a set of tones and indicating a demodulation reference signal pattern, where each tone of the set of tones is configured to carry a demodulation reference signal for at least one symbol of the demodulation reference signal pattern. In some cases, the sidelink control information includes a parameter indicating the aspect to update. The parameter may include an index of a table that corresponds to an updated aspect of a port configuration, where updating the aspect involves selecting the updated aspect from the table according to the index.

The full-frequency component 1315 may identify that each tone of the set of tones is configured to carry a demodulation reference signal for at least one symbol of the demodulation reference signal pattern. By identifying that each tone of the set of tones is configured to carry a demodulation reference signal for at least one symbol of the demodulation reference signal pattern, the full-frequency component 1315 may be capable of using increased SCS while mitigating performance loss associated with performing interpolation at increased the SCS.

The sidelink data transmission component 1320 may receive the sidelink data transmission based on the at least one symbol of the demodulation reference signal pattern carrying the demodulation reference signal for each tone. In some examples, the sidelink data transmission component 1320 may transmit the sidelink data transmission based on the at least one symbol of the demodulation reference signal carrying the demodulation reference signal for each tone.

The reference signal component 1325 may receive the demodulation reference signal over the first resource and the phase tracking reference signal over the second resource based on a non-overlapping relationship between the first resource and the second resource. In some examples, the reference signal component 1325 may transmit the demodulation reference signal over the first resource and the phase tracking reference signal over the second resource based on a non-overlapping relationship between the first resource and the second resource. In some examples, the reference signal component 1325 may receive the demodulation reference signal based on the updated aspect. In some examples, receiving the demodulation reference signal in the first symbol over the virtual port using the first comb configuration, where receiving the demodulation reference signal in the first symbol includes refraining from using the second comb configuration to receive the demodulation reference signal. In some examples, receiving the demodulation reference signal in the second symbol over the virtual port using the second comb configuration, where receiving the demodulation reference signal in the second symbol includes refraining from using the second comb configuration to receive the demodulation reference signal.

The port configuration component 1330 may receive an indication of a port configuration for receiving the demodulation reference signal. In some examples, the port configuration component 1330 may update an aspect of the port configuration. In some examples, the aspect is updated based on a SCS, a channel delay spread, or both. In some examples, the port configuration component 1330 may receive an indication of a port configured to receive the demodulation reference signal over each tone of the set of tones, where the port is used to receive the demodulation reference signal. In some examples, the at least one symbol of the demodulation reference signal pattern may include a first symbol and a second symbol. In some examples, the port configuration component 1330 may identify a first port associated with a first comb configuration and a second port associated with a second comb configuration. In some examples, the port configuration component 1330 may combine the first port and the second port to form a virtual port associated with the first comb configuration and the second comb configuration.

In some examples, transmit an indication of a port configuration for receiving the demodulation reference signal, where the sidelink control information includes a parameter indicating an aspect of the port configuration for the UE to update for receiving the demodulation reference signal. In some examples, the parameter indicates to update the aspect by combining a first port and a second port of the port configuration at the UE to form a virtual port. The parameter indicates, to the UE, to update the aspect by refraining from performing code division multiplexing on a first port of the port configuration with a second port of the port configuration when receiving the demodulation reference signal over the first port. In some examples, the parameter indicates, to the UE, to update the aspect by using a single one of a first comb configuration associated with a first port of the port configuration or a second comb configuration associated with a second port of the port configuration to receive the demodulation reference signal. In some cases, the parameter includes an index of a table that corresponds to the updated aspect.

In some examples, the port configuration component 1330 may transmit, to the UE, an indication of a port configured to receive the demodulation reference signal over each tone of the set of tones. In some cases, the port configuration includes a first port and a second port configured to receive the demodulation reference signal, where updating the aspect includes combining the first port and the second port to form a virtual port, and where the demodulation reference signal is received over the virtual port. In some cases, the port configuration includes a first port and a second port, where updating the aspect includes determining to refrain from performing code division multiplexing on the first port with the second port when receiving the demodulation reference signal over the first port, and where the demodulation reference signal is received over the first port. In some cases, the port configuration includes a first port corresponding to a first comb configuration and a second port corresponding to a second comb configuration, where the first port is configured to use the first comb configuration and the second port is configured to use the second comb configuration to receive the demodulation reference signal, and where updating the aspect includes determining to use a single one of the first comb configuration or the second comb configuration to receive the demodulation reference signal.

The MCS receiver 1335 may receive an indication of a modulation coding scheme, where the aspect is updated based on the modulation coding scheme. In some examples, the aspect may be updated based on the modulation coding scheme having a value above a threshold. In some examples, the aspect may further be updated based on an SCS, a channel delay spread, or both.

The control signaling component 1340 may receive control signaling indicating a configuration for a non-overlapping relationship between a first resource for receiving a demodulation reference signal and a second resource for receiving a phase tracking reference signal. In some examples, receiving the control signaling involves receiving an indication of a demodulation reference signal pattern of the demodulation reference signal, where the demodulation reference signal pattern indicates the first resource for receiving the demodulation reference signal. By receiving the configuration for the non-overlapping relationship, control signaling component 1340 may experience less overhead when determining the second resource.

In some examples, the control signaling component 1340 may transmit control signaling indicating a configuration for a non-overlapping relationship between the first resource and the second resource. In some examples, receiving the control signaling includes receiving first control signaling indicating the first resource and second control signaling indicating the second resource. In some examples, transmitting the control signaling involves transmitting first control signaling indicating the first resource and second control signaling indicating the second resource. In some examples, the control signaling component 1340 may transmit control signaling indicating the demodulation reference signal pattern. In some cases, the second control signaling includes sidelink control information signaling indicating the second resource. In some cases, the second control signaling includes medium access control (MAC) control element signaling or radio resource control signaling indicating the second resource.

The PTRS pattern component 1345 may determine a phase tracking reference signal pattern based on the demodulation reference signal pattern, where the phase tracking reference signal pattern indicates the second resource for receiving the phase tracking reference signal.

The frequency density configuration component 1350 may receive a configuration of a frequency density for the phase tracking reference signal pattern via radio resource control signaling. In some examples, the frequency density configuration component 1350 may transmit a configuration of a frequency density for the phase tracking reference signal pattern via radio resource control signaling.

The relationship determination component 1355 may determine a non-overlapping relationship between a first resource for a demodulation reference signal and a second resource for a phase tracking reference signal. In some examples, determining the non-overlapping relationship involves determining a demodulation reference signal pattern of the demodulation reference signal associated with a phase tracking reference signal pattern that indicates the second resource for the phase tracking reference signal, where the demodulation reference signal pattern indicates the first resource for the demodulation reference signal.

Figure 14:
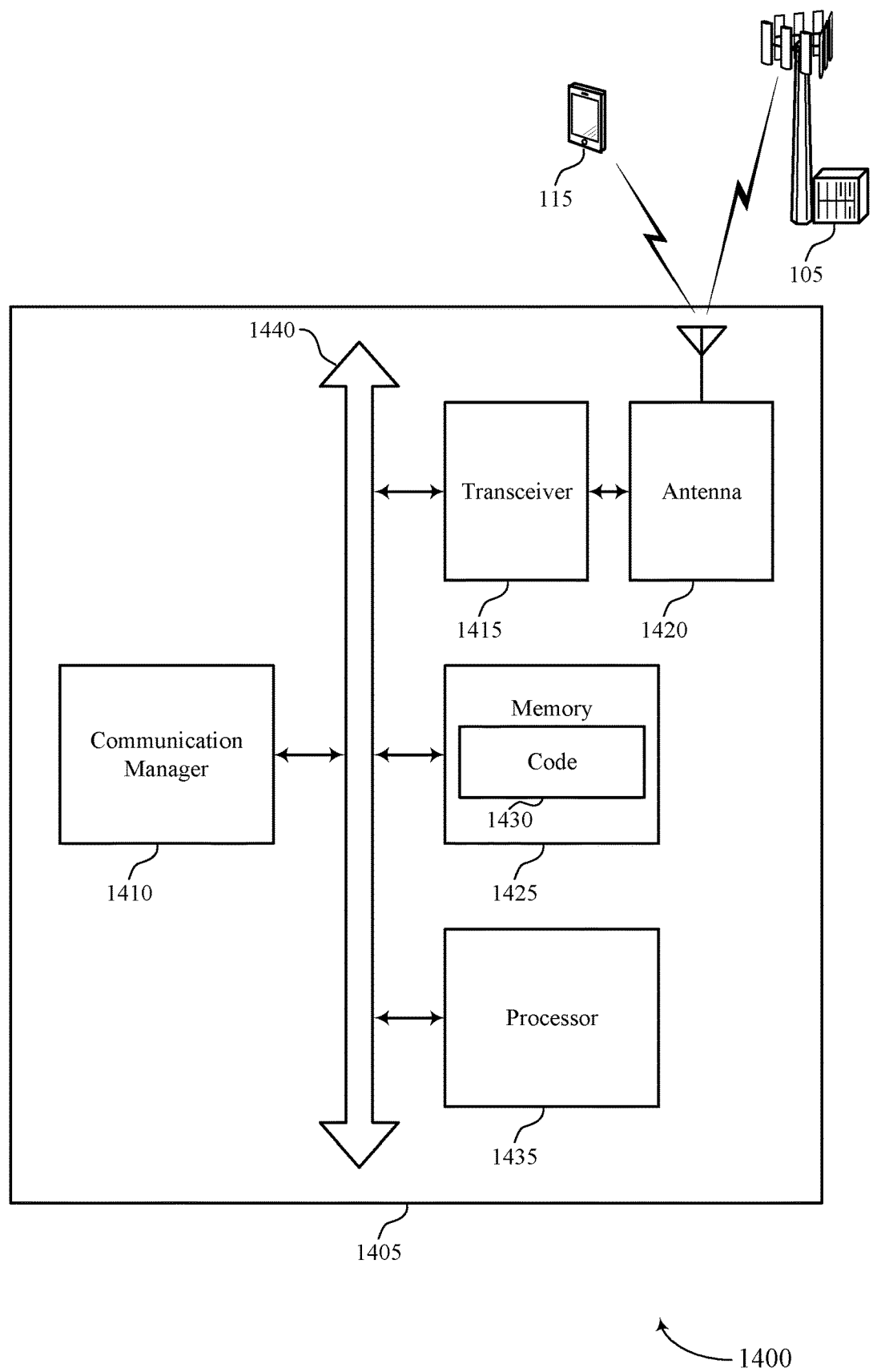
FIG. 14 shows a diagram of a system including a device in accordance with aspects of the present disclosure.

FIG. 14 shows a diagram of a system 1400 including a device 1405 in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communication manager 1410, a transceiver 1415, an antenna 1420, memory 1425, and a processor 1435. These components may be in electronic communication via one or more buses (e.g., bus 1440).

The communication manager 1410 may receive sidelink control information scheduling resources for a sidelink data transmission spanning a set of tones and indicating a demodulation reference signal pattern, identify that each tone of the set of tones is configured to carry a demodulation reference signal for at least one symbol of the demodulation reference signal pattern, and receive the sidelink data transmission based on the at least one symbol of the demodulation reference signal pattern carrying the demodulation reference signal for each tone. The communication manager 1410 may also transmit, to a UE, sidelink control information scheduling resources for a sidelink data transmission spanning a set of tones and indicating a demodulation reference signal pattern, where each tone of the set of tones is configured to carry a demodulation reference signal for at least one symbol of the demodulation reference signal pattern and transmit the sidelink data transmission based on the at least one symbol of the demodulation reference signal carrying the demodulation reference signal for each tone. By identifying that each tone of the set of tones is configured to carry a demodulation reference signal for at least one symbol of the demodulation reference signal pattern, the system 1400 may be capable of using increased SCS while mitigating performance loss associated with performing interpolation at the increased SCS.

The communication manager 1410 may also receive control signaling indicating a first resource for receiving a demodulation reference signal and a second resource for receiving a phase tracking reference signal, where the first resource is non-overlapping in time with the second resource; and receive the demodulation reference signal over the first resource and the phase tracking reference signal over the second resource based on the first resource being non-overlapping in time with the second resource. The communication manager 1410 may also determine a first resource for a demodulation reference signal that is non-overlapping with a second resource for a phase tracking reference signal; transmit control signaling indicating the first resource and the second resource; and transmit the demodulation reference signal over the first resource and the phase tracking reference signal over the second resource based on the first resource being non-overlapping with the second resource. By receiving the configuration for the non-overlapping relationship, system 1400 may experience less overhead when determining the second resource.

The transceiver 1415 may communicate bi-directionally, via one or more antennas, wired, or wireless links as described above. For example, the transceiver 1415 may represent a wireless transceiver and may communicate bi-directionally with another wireless transceiver. The transceiver 1415 may also include a modem to modulate the packets and provide the modulated packets to the antennas for transmission, and to demodulate packets received from the antennas.

In some cases, the wireless device may include a single antenna 1420. However, in some cases the device may have more than one antenna 1420, which may be capable of concurrently transmitting or receiving multiple wireless transmissions.

The memory 1425 may include random-access memory (RAM) and read-only memory (ROM). The memory 1425 may store computer-readable, computer-executable code 1430 including instructions that, when executed, cause the processor to perform various functions described herein. In some cases, the memory 1425 may contain, among other things, a basic input/output system (BIOS) which may control basic hardware or software operation such as the interaction with peripheral components or devices.

The code 1430 may include instructions to implement aspects of the present disclosure, including instructions to support wireless communications. The code 1430 may be stored in a non-transitory computer-readable medium such as system memory or other type of memory. In some cases, the code 1430 may not be directly executable by the processor 1435 but may cause a computer (e.g., when compiled and executed) to perform functions described herein.

The processor 1435 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1435 may be configured to operate a memory array using a memory controller. In other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting sidelink shared channel demodulation reference signal configuration schemes).

By including or configuring the communication manager 1410 in accordance with examples as described herein, the device 1405 may support techniques for the communication manager 1410 to use full-frequency DMRS ports which may enable the device 1405 to use increased SCS while mitigating performance loss associated with performing interpolation. Additionally, the device 1405 may support techniques for the communication manager 1410 to communicate dynamic or semi-dynamic indications of PTRS which may be associated with less overhead than other methods by which the device 1105 may determine PTRS resources over which to communicate PTRS.

Figure 15:
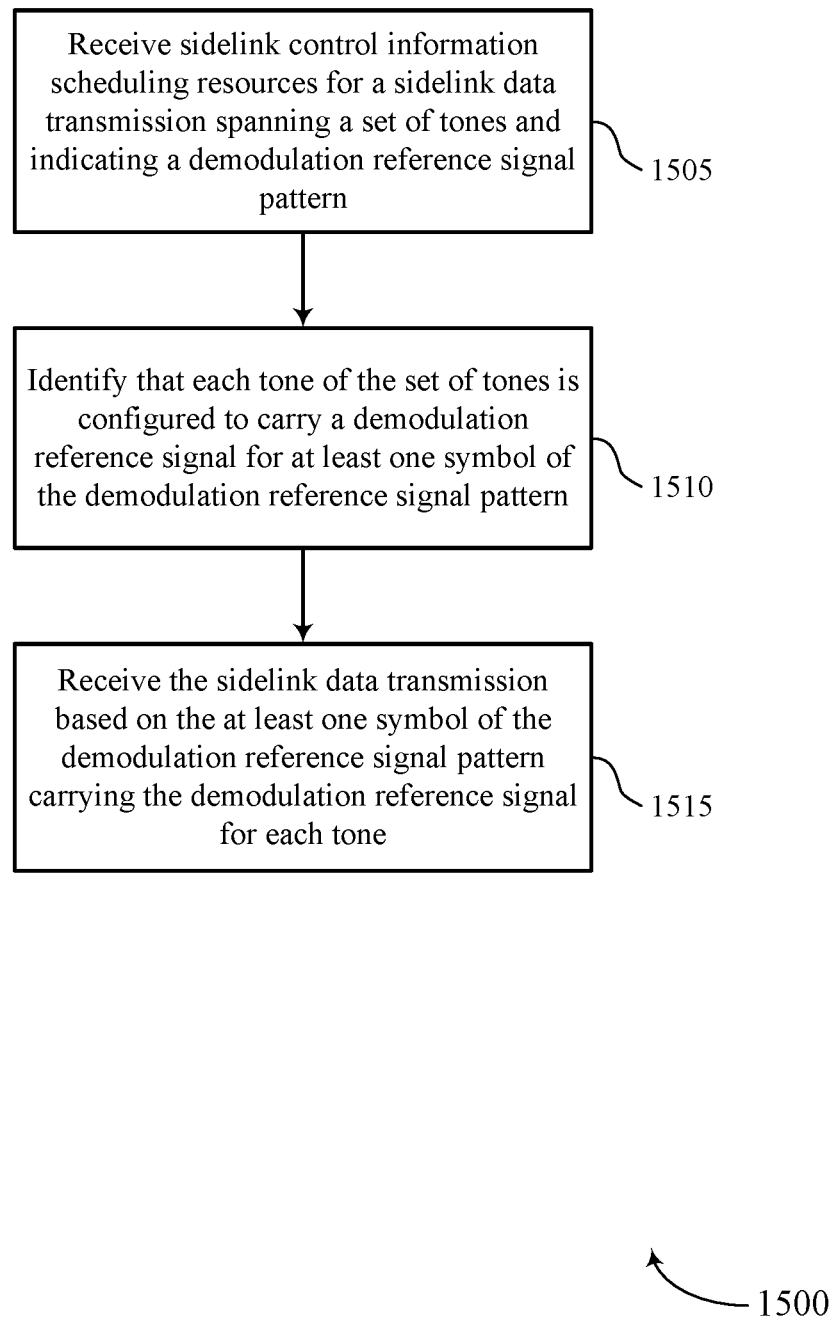
FIGS. 15 through 19 show flowcharts illustrating methods in accordance with aspects of the present disclosure.

FIG. 15 shows a flowchart illustrating a method 1500 in accordance with aspects of the present disclosure. The operations of method 1500 may be implemented by a UE 115 or its components as described herein. For example, the operations of method 1500 may be performed by a communication manager as described with reference to FIGS. 11 through 14. In some examples, a UE may execute a set of instructions to control the functional elements of the UE to perform the described functions. Additionally or alternatively, a UE may perform aspects of the described functions using special-purpose hardware.

At 1505, the UE may receive sidelink control information scheduling resources for a sidelink data transmission spanning a set of tones and indicating a demodulation reference signal pattern. The operations of 1505 may be performed according to the methods described herein. In some examples, aspects of the operations of 1505 may be performed by a SCI component as described with reference to FIGS. 11 through 14.

At 1510, the UE may identify that each tone of the set of tones is configured to carry a demodulation reference signal for at least one symbol of the demodulation reference signal pattern. The operations of 1510 may be performed according to the methods described herein. In some examples, aspects of the operations of 1510 may be performed by a full-frequency component as described with reference to FIGS. 11 through 14.

At 1515, the UE may receive the sidelink data transmission based on the at least one symbol of the demodulation reference signal pattern carrying the demodulation reference signal for each tone. The operations of 1515 may be performed according to the methods described herein. In some examples, aspects of the operations of 1515 may be performed by a sidelink data transmission component as described with reference to FIGS. 11 through 14.

Figure 16:
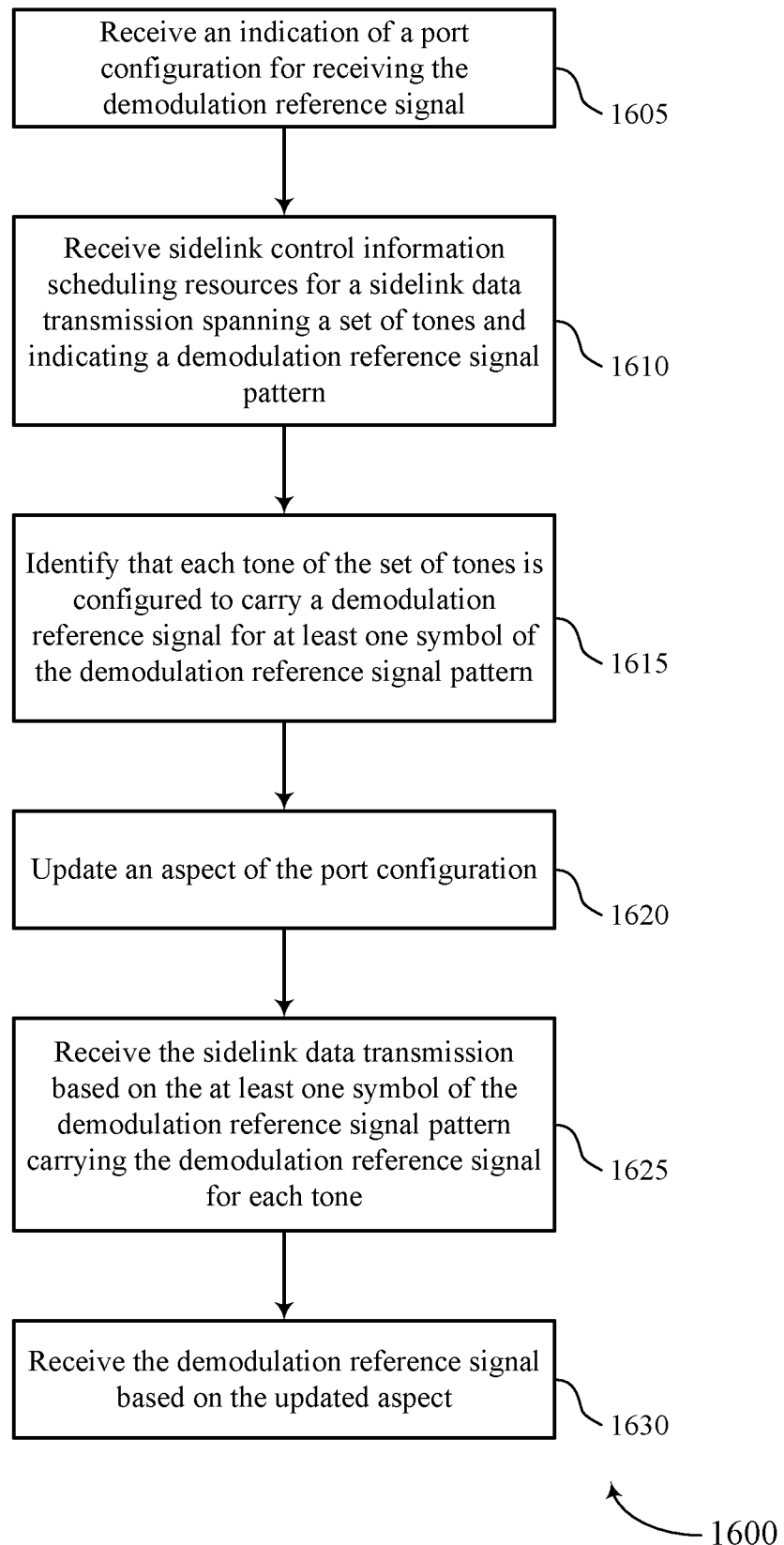

FIG. 16 shows a flowchart illustrating a method 1600 in accordance with aspects of the present disclosure. The operations of method 1600 may be implemented by a UE 115 or its components as described herein. For example, the operations of method 1600 may be performed by a communication manager as described with reference to FIGS. 11 through 14. In some examples, a UE may execute a set of instructions to control the functional elements of the UE to perform the described functions. Additionally or alternatively, a UE may perform aspects of the described functions using special-purpose hardware.

At 1605, the UE may receive an indication of a port configuration for receiving the demodulation reference signal. The operations of 1605 may be performed according to the methods described herein. In some examples, aspects of the operations of 1605 may be performed by a port configuration component as described with reference to FIGS. 11 through 14.

At 1610, the UE may receive sidelink control information scheduling resources for a sidelink data transmission spanning a set of tones and indicating a demodulation reference signal pattern. The operations of 1610 may be performed according to the methods described herein. In some examples, aspects of the operations of 1610 may be performed by a SCI component as described with reference to FIGS. 11 through 14.

At 1615, the UE may identify that each tone of the set of tones is configured to carry a demodulation reference signal for at least one symbol of the demodulation reference signal pattern. The operations of 1615 may be performed according to the methods described herein. In some examples, aspects of the operations of 1615 may be performed by a full-frequency component as described with reference to FIGS. 11 through 14.

At 1620, the UE may update an aspect of the port configuration. The operations of 1620 may be performed according to the methods described herein. In some examples, aspects of the operations of 1620 may be performed by a port configuration component as described with reference to FIGS. 11 through 14.

At 1625, the UE may receive the sidelink data transmission based on the at least one symbol of the demodulation reference signal pattern carrying the demodulation reference signal for each tone. The operations of 1625 may be performed according to the methods described herein. In some examples, aspects of the operations of 1625 may be performed by a sidelink data transmission component as described with reference to FIGS. 11 through 14.

At 1630, the UE may receive the demodulation reference signal based on the updated aspect. The operations of 1630 may be performed according to the methods described herein. In some examples, aspects of the operations of 1630 may be performed by a reference signal component as described with reference to FIGS. 11 through 14.

Figure 17:
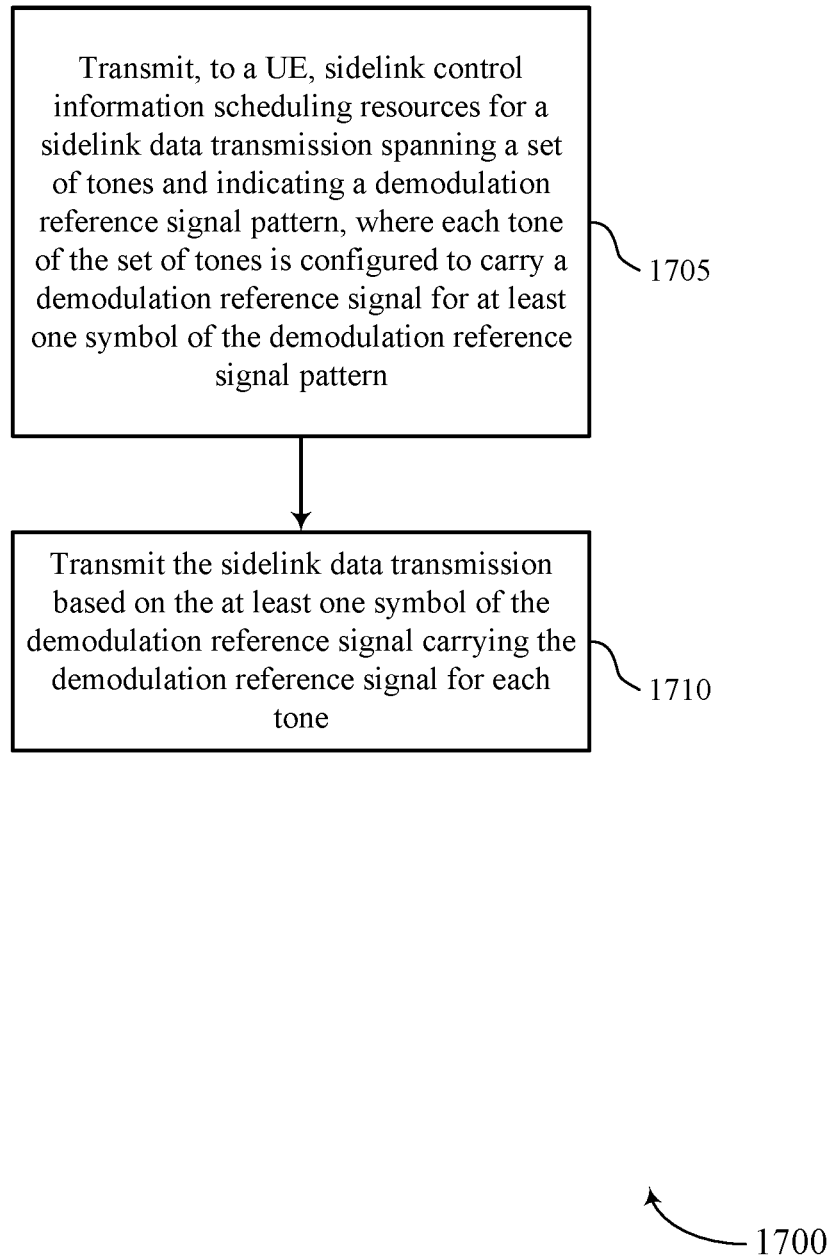

FIG. 17 shows a flowchart illustrating a method 1700 in accordance with aspects of the present disclosure. The operations of method 1700 may be implemented by a UE 115 or its components as described herein. For example, the operations of method 1700 may be performed by a communication manager as described with reference to FIGS. 11 through 14. In some examples, a UE may execute a set of instructions to control the functional elements of the UE to perform the described functions. Additionally or alternatively, a UE may perform aspects of the described functions using special-purpose hardware.

At 1705, the UE may transmit, to a UE, sidelink control information scheduling resources for a sidelink data transmission spanning a set of tones and indicating a demodulation reference signal pattern, where each tone of the set of tones is configured to carry a demodulation reference signal for at least one symbol of the demodulation reference signal pattern. The operations of 1705 may be performed according to the methods described herein. In some examples, aspects of the operations of 1705 may be performed by a SCI component as described with reference to FIGS. 11 through 14.

At 1710, the UE may transmit the sidelink data transmission based on the at least one symbol of the demodulation reference signal carrying the demodulation reference signal for each tone. The operations of 1710 may be performed according to the methods described herein. In some examples, aspects of the operations of 1710 may be performed by a sidelink data transmission component as described with reference to FIGS. 11 through 14.

Figure 18:
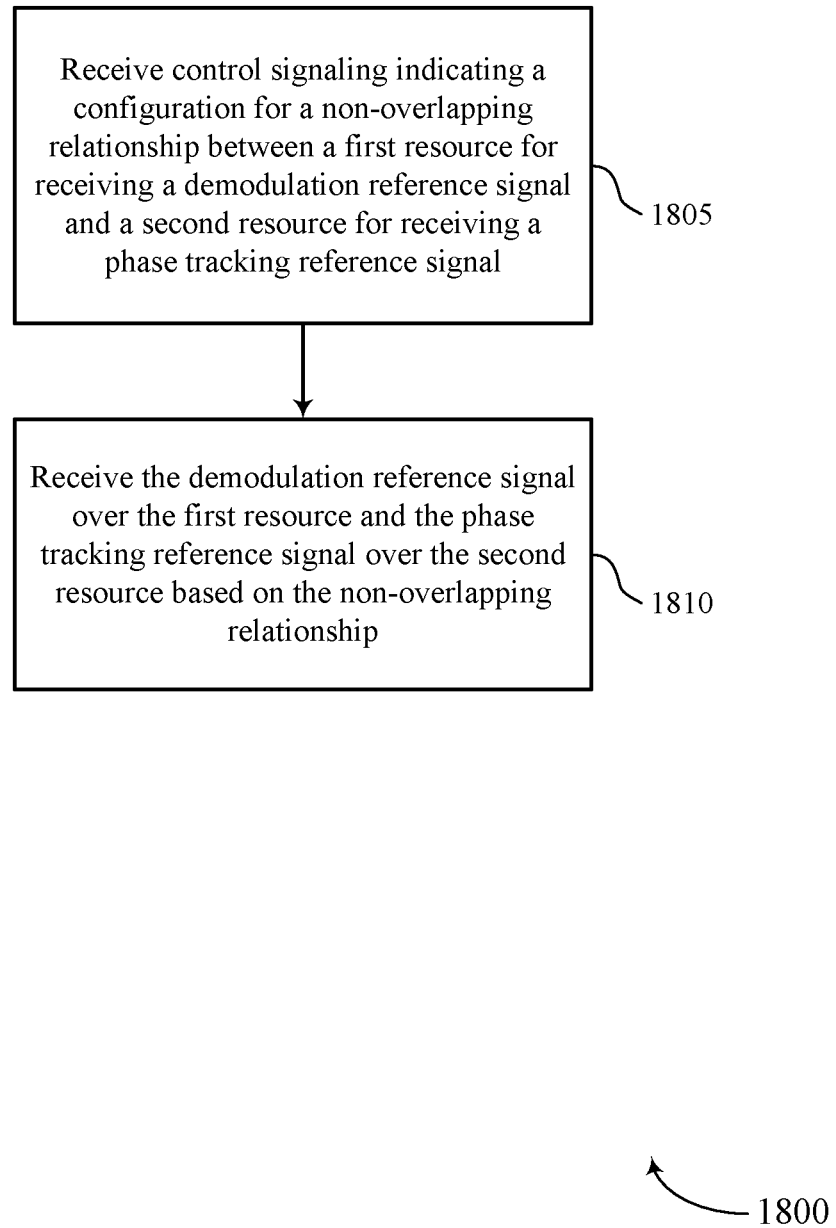

FIG. 18 shows a flowchart illustrating a method 1800 in accordance with aspects of the present disclosure. The operations of method 1800 may be implemented by a UE 115 or its components as described herein. For example, the operations of method 1800 may be performed by a communication manager as described with reference to FIGS. 11 through 14. In some examples, a UE may execute a set of instructions to control the functional elements of the UE to perform the described functions. Additionally or alternatively, a UE may perform aspects of the described functions using special-purpose hardware.

At 1805, the UE may receive control signaling indicating a configuration for a non-overlapping relationship between a first resource for receiving a demodulation reference signal and a second resource for receiving a phase tracking reference signal. The operations of 1805 may be performed according to the methods described herein. In some examples, aspects of the operations of 1805 may be performed by a control signaling component as described with reference to FIGS. 11 through 14.

At 1810, the UE may receive the demodulation reference signal over the first resource and the phase tracking reference signal over the second resource based on the non-overlapping relationship. The operations of 1810 may be performed according to the methods described herein. In some examples, aspects of the operations of 1810 may be performed by a reference signal component as described with reference to FIGS. 11 through 14.

Figure 19:
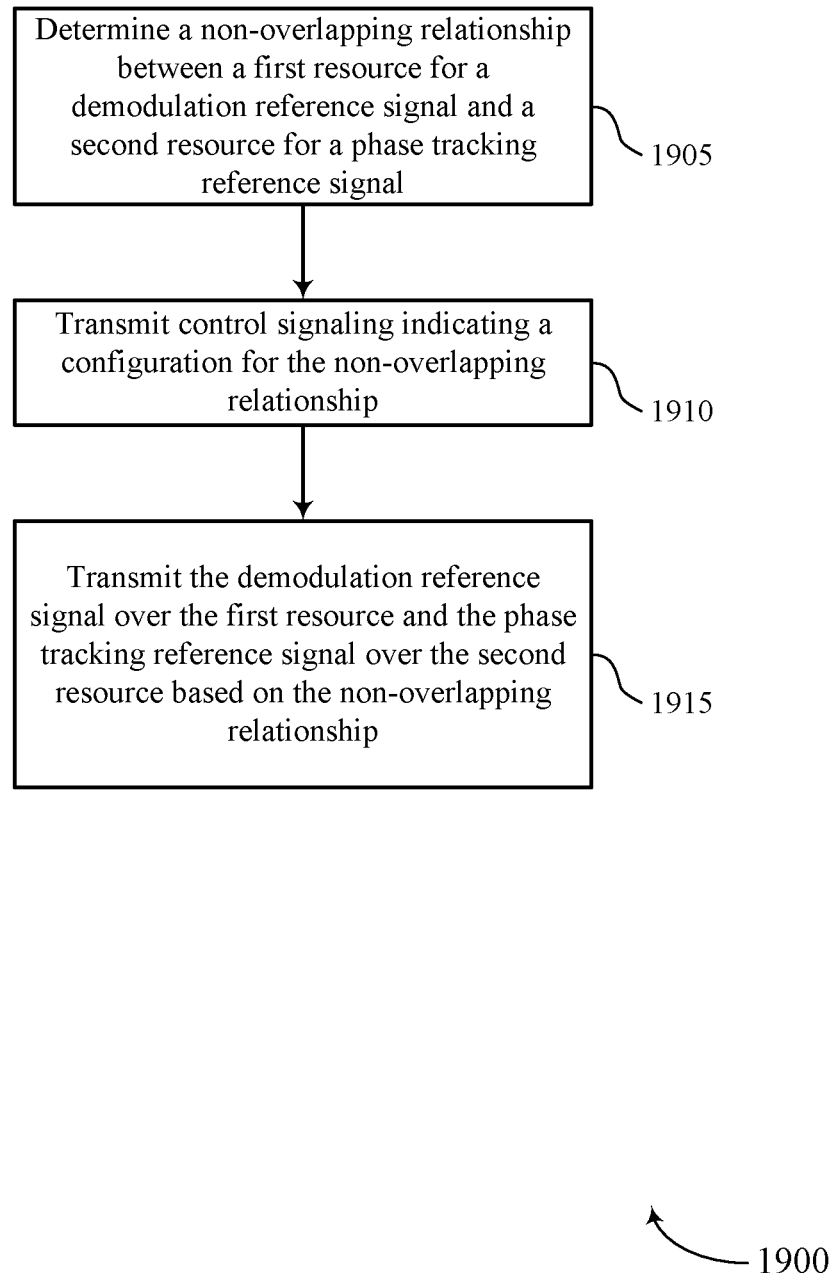

FIG. 19 shows a flowchart illustrating a method 1900 in accordance with aspects of the present disclosure. The operations of method 1900 may be implemented by a UE 115 or its components as described herein. For example, the operations of method 1900 may be performed by a communication manager as described with reference to FIGS. 11 through 14. In some examples, a UE may execute a set of instructions to control the functional elements of the UE to perform the described functions. Additionally or alternatively, a UE may perform aspects of the described functions using special-purpose hardware.

At 1905, the UE may determine a non-overlapping relationship between a first resource for a demodulation reference signal and a second resource for a phase tracking reference signal. The operations of 1905 may be performed according to the methods described herein. In some examples, aspects of the operations of 1905 may be performed by a relationship determination component as described with reference to FIGS. 11 through 14.

At 1910, the UE may transmit control signaling indicating a configuration for the non-overlapping relationship. The operations of 1910 may be performed according to the methods described herein. In some examples, aspects of the operations of 1910 may be performed by a control signaling component as described with reference to FIGS. 11 through 14.

At 1915, the UE may transmit the demodulation reference signal over the first resource and the phase tracking reference signal over the second resource based on the non-overlapping relationship. The operations of 1915 may be performed according to the methods described herein. In some examples, aspects of the operations of 1915 may be performed by a reference signal component as described with reference to FIGS. 11 through 14.

The following provides an overview of aspects of the present disclosure:

Aspect 1: A method for wireless communication, comprising: receiving sidelink control information scheduling resources for a sidelink data transmission spanning a set of tones and indicating a demodulation reference signal pattern; identifying that each tone of the set of tones is configured to carry a demodulation reference signal for at least one symbol of the demodulation reference signal pattern; and receiving the sidelink data transmission based at least in part on the at least one symbol of the demodulation reference signal pattern carrying the demodulation reference signal for each tone.

Aspect 2: The method of aspect 1, further comprising: receiving an indication of a port configuration for receiving the demodulation reference signal; updating an aspect of the port configuration; and receiving the demodulation reference signal based at least in part on the updated aspect.

Aspect 3: The method of aspect 2, wherein the aspect is updated based at least in part on a subcarrier spacing, a channel delay spread, or both.

Aspect 4: The method of any of aspects 2 through 3, further comprising: receiving an indication of a modulation coding scheme, wherein the aspect is updated based at least in part on the modulation coding scheme.

Aspect 5: The method of aspect 4, wherein the aspect is updated based at least in part on the modulation coding scheme having a value above a threshold.

Aspect 6: The method of any of aspects 4 through 5, wherein the aspect is further updated based at least in part on a subcarrier spacing, a channel delay spread, or both.

Aspect 7: The method of any of aspects 2 through 6, wherein the sidelink control information comprises a parameter indicating the aspect to update.

Aspect 8: The method of aspect 7, wherein the parameter comprises an index of a table that corresponds to the updated aspect, updating the aspect comprises selecting the updated aspect from the table according to the index.

Aspect 9: The method of any of aspects 2 through 8, wherein the port configuration comprises a first port and a second port configured to receive the demodulation reference signal, and updating the aspect comprises combining the first port and the second port to form a virtual port, and the demodulation reference signal is received over the virtual port.

Aspect 10: The method of any of aspects 2 through 9, wherein the port configuration comprises a first port and a second port, and updating the aspect comprises determining to refrain from performing code division multiplexing on the first port with the second port when receiving the demodulation reference signal over the first port, and the demodulation reference signal is received over the first port.

Aspect 11: The method of any of aspects 2 through 10, wherein the port configuration comprises a first port corresponding to a first comb configuration and a second port corresponding to a second comb configuration, the first port is configured to use the first comb configuration and the second port is configured to use the second comb configuration to receive the demodulation reference signal, and updating the aspect comprises determining to use a single one of the first comb configuration or the second comb configuration to receive the demodulation reference signal.

Aspect 12: The method of any of aspects 1 through 11, further comprising: receiving an indication of a port configured to receive the demodulation reference signal over each tone of the set of tones, wherein the port is used to receive the demodulation reference signal.

Aspect 13: The method of any of aspects 1 through 12, wherein the at least one symbol of the demodulation reference signal pattern comprises a first symbol and a second symbol, and further comprising: identifying a first port associated with a first comb configuration and a second port associated with a second comb configuration; combining the first port and the second port to form a virtual port associated with the first comb configuration and the second comb configuration; receiving the demodulation reference signal in the first symbol over the virtual port using the first comb configuration, wherein receiving the demodulation reference signal in the first symbol comprises refraining from using the second comb configuration to receive the demodulation reference signal; and receiving the demodulation reference signal in the second symbol over the virtual port using the second comb configuration, wherein receiving the demodulation reference signal in the second symbol comprises refraining from using the second comb configuration to receive the demodulation reference signal.

Aspect 14: A method for wireless communications, comprising: transmitting, to a UE, sidelink control information scheduling resources for a sidelink data transmission spanning a set of tones and indicating a demodulation reference signal pattern, wherein each tone of the set of tones is configured to carry a demodulation reference signal for at least one symbol of the demodulation reference signal pattern; and transmitting the sidelink data transmission based at least in part on the at least one symbol of the demodulation reference signal carrying the demodulation reference signal for each tone.

Aspect 15: The method of aspect 14, further comprising: transmitting an indication of a port configuration for receiving the demodulation reference signal, wherein the sidelink control information comprises a parameter indicating an aspect of the port configuration for the UE to update for receiving the demodulation reference signal.

Aspect 16: The method of aspect 15, wherein the parameter indicates to update the aspect by combining a first port and a second port of the port configuration at the UE to form a virtual port.

Aspect 17: The method of any of aspects 15 through 16, wherein the parameter indicates, to the UE, to update the aspect by refraining from performing code division multiplexing on a first port of the port configuration with a second port of the port configuration when receiving the demodulation reference signal over the first port.

Aspect 18: The method of any of aspects 15 through 17, wherein the parameter indicates, to the UE, to update the aspect by using a single one of a first comb configuration associated with a first port of the port configuration or a second comb configuration associated with a second port of the port configuration to receive the demodulation reference signal.

Aspect 19: The method of any of aspects 15 through 18, wherein the parameter comprises an index of a table that corresponds to the updated aspect.

Aspect 20: The method of any of aspects 14 through 19, further comprising: transmitting, to the UE, an indication of a port configured to receive the demodulation reference signal over each tone of the set of tones.

Aspect 21: A method for wireless communications, comprising: receiving control signaling indicating a configuration for a non-overlapping relationship between a first resource for receiving a demodulation reference signal and a second resource for receiving a phase tracking reference signal; and receiving the demodulation reference signal over the first resource and the phase tracking reference signal over the second resource based at least in part on the non-overlapping relationship.

Aspect 22: The method of aspect 21, wherein receiving the control signaling comprises receiving first control signaling indicating the first resource and second control signaling indicating the second resource.

Aspect 23: The method of aspect 22, wherein the second control signaling comprises sidelink control information signaling indicating the second resource.

Aspect 24: The method of any of aspects 22 through 23, wherein the second control signaling comprises medium access control (MAC) control element signaling or radio resource control signaling indicating the second resource.

Aspect 25: The method of any of aspects 21 through 24, wherein receiving the control signaling comprises receiving an indication of a demodulation reference signal pattern of the demodulation reference signal, wherein the demodulation reference signal pattern indicates the first resource for receiving the demodulation reference signal, the method further comprising: determining a phase tracking reference signal pattern based at least in part on the demodulation reference signal pattern, wherein the phase tracking reference signal pattern indicates the second resource for receiving the phase tracking reference signal.

Aspect 26: The method of aspect 25, further comprising: receiving a configuration of a frequency density for the phase tracking reference signal pattern via radio resource control signaling.

Aspect 27: A method for wireless communications, comprising: determining a non-overlapping relationship between a first resource for a demodulation reference signal and a second resource for a phase tracking reference signal; transmitting control signaling indicating a configuration for the non-overlapping relationship; and transmitting the demodulation reference signal over the first resource and the phase tracking reference signal over the second resource based at least in part on the non-overlapping relationship.

Aspect 28: The method of aspect 27, wherein transmitting the control signaling comprises transmitting first control signaling indicating the first resource and second control signaling indicating the second resource.

Aspect 29: The method of aspect 28, wherein the second control signaling comprises sidelink control information signaling indicating the second resource.

Aspect 30: The method of any of aspects 28 through 29, wherein the second control signaling comprises medium access control (MAC) control element signaling or radio resource control signaling indicating the second resource.

Aspect 31: The method of any of aspects 27 through 30, wherein determining the non-overlapping relationship comprises determining a demodulation reference signal pattern of the demodulation reference signal associated with a phase tracking reference signal pattern that indicates the second resource for the phase tracking reference signal, wherein the demodulation reference signal pattern indicates the first resource for the demodulation reference signal, and wherein transmitting the control signaling comprises: transmitting control signaling indicating the demodulation reference signal pattern.

Aspect 32: The method of aspect 31, further comprising: transmitting a configuration of a frequency density for the phase tracking reference signal pattern via radio resource control signaling.

Aspect 33: An apparatus for wireless communication, comprising a processor; memory coupled with the processor; and instructions stored in the memory and executable by the processor to cause the apparatus to perform a method of any of aspects 1 through 13 and/or 45.

Aspect 34: An apparatus for wireless communication, comprising at least one means for performing a method of any of aspects 1 through 13 and/or 45.

Aspect 35: A non-transitory computer-readable medium storing code for wireless communication, the code comprising instructions executable by a processor to perform a method of any of aspects 1 through 13 and/or 45.

Aspect 36: An apparatus for wireless communications, comprising a processor; memory coupled with the processor; and instructions stored in the memory and executable by the processor to cause the apparatus to perform a method of any of aspects 14 through 20.

Aspect 37: An apparatus for wireless communications, comprising at least one means for performing a method of any of aspects 14 through 20.

Aspect 38: A non-transitory computer-readable medium storing code for wireless communications, the code comprising instructions executable by a processor to perform a method of any of aspects 14 through 20.

Aspect 39: An apparatus for wireless communications, comprising a processor; memory coupled with the processor; and instructions stored in the memory and executable by the processor to cause the apparatus to perform a method of any of aspects 21 through 26.

Aspect 40: An apparatus for wireless communications, comprising at least one means for performing a method of any of aspects 21 through 26.

Aspect 41: A non-transitory computer-readable medium storing code for wireless communications, the code comprising instructions executable by a processor to perform a method of any of aspects 21 through 26.

Aspect 42: An apparatus for wireless communications, comprising a processor; memory coupled with the processor; and instructions stored in the memory and executable by the processor to cause the apparatus to perform a method of any of aspects 27 through 32.

Aspect 43: An apparatus for wireless communications, comprising at least one means for performing a method of any of aspects 27 through 32.

Aspect 44: A non-transitory computer-readable medium storing code for wireless communications, the code comprising instructions executable by a processor to perform a method of any of aspects 27 through 32.

Aspect 45: The method of any of aspects 1 through 13, wherein the port configuration comprises a first port and a second port, and wherein updating the aspect comprises one or more of: combining the first port and the second port to form a virtual port, wherein the demodulation reference signal is received over the virtual port; determining to refrain from performing code division multiplexing on the first port with a third port when receiving the demodulation reference signal over the first port, wherein the demodulation signal is received over the first port; and determining to use a single one of a first comb configuration corresponding to the first port or a second comb configuration corresponding to the second port to receive the demodulation reference signal.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving sidelink control information scheduling resources for a sidelink data transmission spanning a set of tones and indicating a demodulation reference signal pattern;
identifying that each tone of the set of tones is configured to carry a demodulation reference signal for at least one symbol of the demodulation reference signal pattern; and
receiving the sidelink data transmission based at least in part on the at least one symbol of the demodulation reference signal pattern carrying the demodulation reference signal for each tone.

2. The method of claim 1, further comprising:
receiving an indication of a port configuration for receiving the demodulation reference signal;
updating an aspect of the port configuration; and
receiving the demodulation reference signal based at least in part on the updated aspect.

3. The method of claim 2, wherein the aspect is updated based at least in part on a subcarrier spacing, a channel delay spread, or both.

4. The method of claim 2, further comprising:
receiving an indication of a modulation coding scheme, wherein the aspect is updated based at least in part on the modulation coding scheme.

5. The method of claim 4, wherein the aspect is updated based at least in part on the modulation coding scheme having a value above a threshold.

6. The method of claim 4, wherein the aspect is further updated based at least in part on a subcarrier spacing, a channel delay spread, or both.

7. The method of claim 2, wherein the sidelink control information comprises a parameter indicating the aspect to update.

8. The method of claim 7, wherein the parameter comprises an index of a table that corresponds to the updated aspect, wherein updating the aspect comprises selecting the updated aspect from the table according to the index.

9. The method of claim 2, wherein the port configuration comprises a first port and a second port configured to receive the demodulation reference signal, and wherein updating the aspect comprises combining the first port and the second port to form a virtual port, and wherein the demodulation reference signal is received over the virtual port.

10. The method of claim 2, wherein the port configuration comprises a first port and a second port, and wherein updating the aspect comprises determining to refrain from performing code division multiplexing on the first port with the second port when receiving the demodulation reference signal over the first port, and wherein the demodulation reference signal is received over the first port.

11. The method of claim 2, wherein the port configuration comprises a first port corresponding to a first comb configuration and a second port corresponding to a second comb configuration, wherein the first port is configured to use the first comb configuration and the second port is configured to use the second comb configuration to receive the demodulation reference signal, and wherein updating the aspect comprises determining to use a single one of the first comb configuration or the second comb configuration to receive the demodulation reference signal.

12. The method of claim 2, wherein the port configuration comprises a first port and a second port, and wherein updating the aspect comprises one or more of:
combining the first port and the second port to form a virtual port, wherein the demodulation reference signal is received over the virtual port;
determining to refrain from performing code division multiplexing on the first port with a third port when receiving the demodulation reference signal over the first port, wherein the demodulation signal is received over the first port; and
determining to use a single one of a first comb configuration corresponding to the first port or a second comb configuration corresponding to the second port to receive the demodulation reference signal.

13. The method of claim 1, further comprising:
receiving an indication of a port configured to receive the demodulation reference signal over each tone of the set of tones, wherein the port is used to receive the demodulation reference signal.

14. The method of claim 1, wherein the at least one symbol of the demodulation reference signal pattern comprises a first symbol and a second symbol, and further comprising:
identifying a first port associated with a first comb configuration and a second port associated with a second comb configuration;
combining the first port and the second port to form a virtual port associated with the first comb configuration and the second comb configuration;
receiving the demodulation reference signal in the first symbol over the virtual port using the first comb configuration, wherein receiving the demodulation reference signal in the first symbol comprises refraining from using the second comb configuration to receive the demodulation reference signal; and
receiving the demodulation reference signal in the second symbol over the virtual port using the second comb configuration, wherein receiving the demodulation reference signal in the second symbol comprises refraining from using the second comb configuration to receive the demodulation reference signal.

15. A method for wireless communications, comprising:
transmitting, to a user equipment (UE), sidelink control information scheduling resources for a sidelink data transmission spanning a set of tones and indicating a demodulation reference signal pattern, wherein each tone of the set of tones is configured to carry a demodulation reference signal for at least one symbol of the demodulation reference signal pattern; and
transmitting the sidelink data transmission based at least in part on the at least one symbol of the demodulation reference signal carrying the demodulation reference signal for each tone.

16. The method of claim 15, further comprising:
transmitting an indication of a port configuration for receiving the demodulation reference signal, wherein the sidelink control information comprises a parameter indicating an aspect of the port configuration for the UE to update for receiving the demodulation reference signal.

17. An apparatus for wireless communication, comprising:
a processor,
memory in electronic communication with the processor, and
instructions stored in the memory and executable by the processor to cause the apparatus to:
receive sidelink control information scheduling resources for a sidelink data transmission spanning a set of tones and indicating a demodulation reference signal pattern;
identify that each tone of the set of tones is configured to carry a demodulation reference signal for at least one symbol of the demodulation reference signal pattern; and
receive the sidelink data transmission based at least in part on the at least one symbol of the demodulation reference signal pattern carrying the demodulation reference signal for each tone.

18. The apparatus of claim 17, wherein the instructions are further executable by the processor to cause the apparatus to:
receive an indication of a port configuration for receiving the demodulation reference signal;
update an aspect of the port configuration; and
receive the demodulation reference signal based at least in part on the updated aspect.

19. The apparatus of claim 18, wherein the aspect is updated based at least in part on a subcarrier spacing, a channel delay spread, or both.

20. The apparatus of claim 18, wherein the instructions are further executable by the processor to cause the apparatus to:
receive an indication of a modulation coding scheme, wherein the aspect is updated based at least in part on the modulation coding scheme.

21. The apparatus of claim 20, wherein the aspect is updated based at least in part on the modulation coding scheme having a value above a threshold.

22. The apparatus of claim 20, wherein the aspect is further updated based at least in part on a subcarrier spacing, a channel delay spread, or both.

23. The apparatus of claim 18, wherein the sidelink control information comprises a parameter indicating the aspect to update.

24. The apparatus of claim 23, wherein the parameter comprises an index of a table that corresponds to the updated aspect, wherein updating the aspect comprises selecting the updated aspect from the table according to the index.

25. The apparatus of claim 18, wherein the port configuration comprises a first port and a second port configured to receive the demodulation reference signal, and wherein updating the aspect comprises combining the first port and the second port to form a virtual port, and wherein the demodulation reference signal is received over the virtual port.

26. The apparatus of claim 18, wherein the port configuration comprises a first port and a second port, and wherein updating the aspect comprises determining to refrain from performing code division multiplexing on the first port with the second port when receiving the demodulation reference signal over the first port, and wherein the demodulation reference signal is received over the first port.

27. The apparatus of claim 18, wherein the port configuration comprises a first port corresponding to a first comb configuration and a second port corresponding to a second comb configuration, wherein the first port is configured to use the first comb configuration and the second port is configured to use the second comb configuration to receive the demodulation reference signal, and wherein updating the aspect comprises determining to use a single one of the first comb configuration or the second comb configuration to receive the demodulation reference signal.

28. The apparatus of claim 17, wherein the instructions are further executable by the processor to cause the apparatus to:
receive an indication of a port configured to receive the demodulation reference signal over each tone of the set of tones, wherein the port is used to receive the demodulation reference signal.

29. The apparatus of claim 17, wherein the at least one symbol of the demodulation reference signal pattern comprises a first symbol and a second symbol, and wherein the instructions are further executable by the processor to cause the apparatus to:
identify a first port associated with a first comb configuration and a second port associated with a second comb configuration;
combine the first port and the second port to form a virtual port associated with the first comb configuration and the second comb configuration;
receive the demodulation reference signal in the first symbol over the virtual port using the first comb configuration, wherein receiving the demodulation reference signal in the first symbol are executable by the processor to cause the apparatus to refrain from using the second comb configuration to receive the demodulation reference signal; and
receive the demodulation reference signal in the second symbol over the virtual port using the second comb configuration, wherein receiving the demodulation reference signal in the second symbol are executable by the processor to cause the apparatus to refrain from using the second comb configuration to receive the demodulation reference signal.

30. An apparatus for wireless communications, comprising:
a processor,
memory in electronic communication with the processor, and
instructions stored in the memory and executable by the processor to cause the apparatus to:
transmit, to a user equipment (UE), sidelink control information scheduling resources for a sidelink data transmission spanning a set of tones and indicating a demodulation reference signal pattern, wherein each tone of the set of tones is configured to carry a demodulation reference signal for at least one symbol of the demodulation reference signal pattern; and
transmit the sidelink data transmission based at least in part on the at least one symbol of the demodulation reference signal carrying the demodulation reference signal for each tone.

* * * * *